United States Patent [19]

Ueda et al.

[11] 4,079,207
[45] Mar. 14, 1978

[54] TELECOMMUNICATION SWITCHING SYSTEM

[75] Inventors: Tohru Ueda; Tadakazu Morisawa, both of Kodaira; Yoshiaki Nunotani, Seki, all of Japan

[73] Assignee: Nippon Telegraph and Telephone Public Corporation, Tokyo, Japan

[21] Appl. No.: 750,640

[22] Filed: Dec. 15, 1976

[30] Foreign Application Priority Data

Dec. 26, 1975 Japan ............................. 51-158424

[51] Int. Cl.² ........................................... H04M 3/22
[52] U.S. Cl. ....................... 179/18 FD; 179/18 GE; 179/22
[58] Field of Search ........ 179/18 FD, 18 FF, 18 HA, 179/18 AG, 18 AH, 22, 18 GE

[56] References Cited

U.S. PATENT DOCUMENTS

| | | | |
|---|---|---|---|
| 3,308,242 | 3/1967 | Erwin .............................. | 179/18 FF |
| 3,389,227 | 6/1968 | Catterall et al. ...................... | 179/22 |
| 3,390,236 | 6/1968 | Lawrence .............................. | 179/22 |
| 3,581,018 | 5/1971 | Harland et al. ....................... | 179/22 |

*Primary Examiner*—Thomas A. Robinson
*Attorney, Agent, or Firm*—Staas & Halsey

[57] ABSTRACT

A telecommunication switching system in which a required number of switching arrays or matrixes are combined together and the switching arrays or matrixes are divided into a group having in a predetermined ratio outlets of non-multiple connection and outlets of multiple connection, and into a group having outlets of multiple connection, whereby to obtain a desired concentration ratio without using new exclusive switching arrays or matrixes, or rendering some inlets of the switching arrays or matrixes of no use. In the selection or hunting of outlets of the switching arrays or matrixes, the selection or hunting starts with the outlets of non-multiple connection so long as an idle outlet exists, and thereby improves the traffic characteristics of the switching system.

7 Claims, 42 Drawing Figures

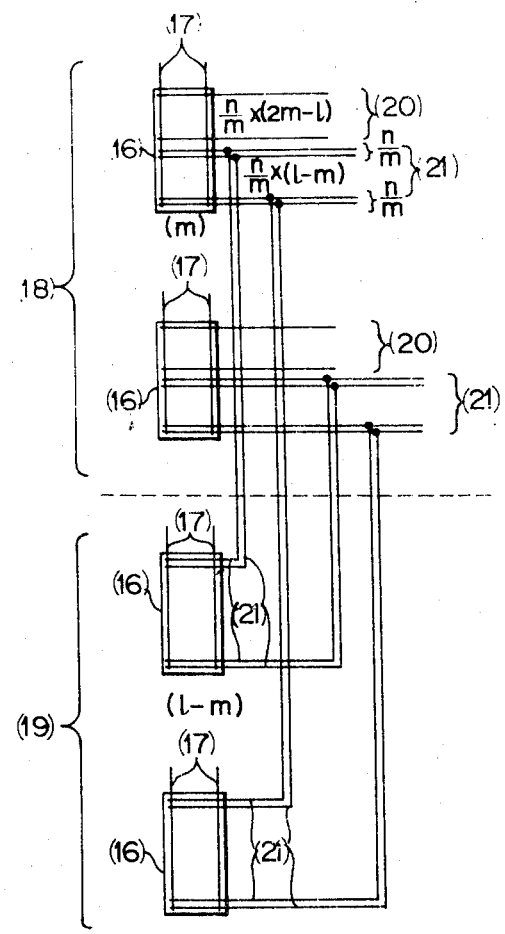

| | 7 | 6 | 5 | 4 | 3 | 2 | 1 | 0 | OLV / B.PSW |
|---|---|---|---|---|---|---|---|---|---|
| | 07 | 06 | 05 | 04 | 03 | 02 | 01 | 00 | 0 |
| | 17 | 16 | 15 | 14 | 13 | 12 | 11 | 10 | 1 |
| | 27 | 26 | 25 | 24 | 23 | 22 | 21 | 20 | 2 |
| | 37 | 36 | 35 | 34 | 33 | 32 | 31 | 30 | 3 |
| | 47 | 46 | 45 | 44 | 43 | 42 | 41 | 40 | 4 |
| | 57 | 56 | 55 | 54 | 53 | 52 | 51 | 50 | 5 |
| | 67 | 66 | 65 | 64 | 63 | 62 | 61 | 60 | 6 |
| | 77 | 76 | 75 | 74 | 73 | 72 | 71 | 70 | 7 |

(310)

302

| | 7 | 6 | 5 | 4 | 3 | 2 | 1 | 0 | OLV / B.PSW |
|---|---|---|---|---|---|---|---|---|---|
| | 07 | 06 | 05 | 04 | 03 | 02 | 01 | 00 | 0 |
| | 17 | 16 | 15 | 14 | 13 | 12 | 11 | 10 | 1 |
| | 27 | 26 | 25 | 24 | 23 | 22 | 21 | 20 | 2 |
| | 37 | 36 | 35 | 34 | 33 | 32 | 31 | 30 | 3 |
| | 47 | 46 | 45 | 44 | 43 | 42 | 41 | 40 | 4 |
| | 57 | 56 | 55 | 54 | 53 | 52 | 51 | 50 | 5 |
| | 67 | 66 | 65 | 64 | 63 | 62 | 61 | 60 | 6 |
| | 77 | 76 | 75 | 74 | 73 | 72 | 71 | 70 | 7 |

(310)

304

| | 7 | 6 | 5 | 4 | 3 | 2 | 1 | 0 | OLV / B.PSW |
|---|---|---|---|---|---|---|---|---|---|
| | 07 | 06 | 05 | 04 | 03 | 02 | 01 | 00 | 0 |
| | 17 | 16 | 15 | 14 | 13 | 12 | 11 | 10 | 1 |
| | 27 | 26 | 25 | 24 | 23 | 22 | 21 | 20 | 2 |
| | 37 | 36 | 35 | 34 | 33 | 32 | 31 | 30 | 3 |
| | 47 | 46 | 45 | 44 | 43 | 42 | 41 | 40 | 4 |
| | 57 | 56 | 55 | 54 | 53 | 52 | 51 | 50 | 5 |
| | 67 | 66 | 65 | 64 | 63 | 62 | 61 | 60 | 6 |
| | 77 | 76 | 75 | 74 | 73 | 72 | 71 | 70 | 7 |

| | 7 | 6 | 5 | 4 | 3 | 2 | 1 | 0 | OLV / E.PSW |
|---|---|---|---|---|---|---|---|---|---|
| | 17 | 16 | 15 | 14 | 03 | 02 | 01 | 00 | 0 |
| | 37 | 36 | 35 | 34 | 23 | 22 | 21 | 20 | 1 |
| | 57 | 56 | 55 | 54 | 43 | 42 | 41 | 40 | 2 |
| | 77 | 76 | 75 | 74 | 63 | 62 | 61 | 60 | 3 |

(303)

| | 7 | 6 | 5 | 4 | 3 | 2 | 1 | 0 | OLV / E.PSW |
|---|---|---|---|---|---|---|---|---|---|
| | 37 | 36 | 25 | 24 | 13 | 12 | 01 | 00 | 0 |
| | 77 | 76 | 65 | 64 | 53 | 52 | 41 | 40 | 1 |

(305)

| | 7 | 6 | 5 | 4 | 3 | 2 | 1 | 0 | OLV / E.PSW |
|---|---|---|---|---|---|---|---|---|---|
| | 37 | 36 | 25 | 24 | 13 | 12 | 01 | 00 | 0 |
| | 07 | 06 | 35 | 34 | 23 | 22 | 11 | 10 | 1 |
| | 17 | 16 | 05 | 04 | 33 | 32 | 21 | 20 | 2 |
| | 77 | 76 | 65 | 64 | 53 | 52 | 41 | 40 | 3 |
| | 47 | 46 | 75 | 74 | 63 | 62 | 51 | 50 | 4 |
| | 57 | 56 | 45 | 44 | 73 | 72 | 61 | 60 | 5 |

F I G. 15
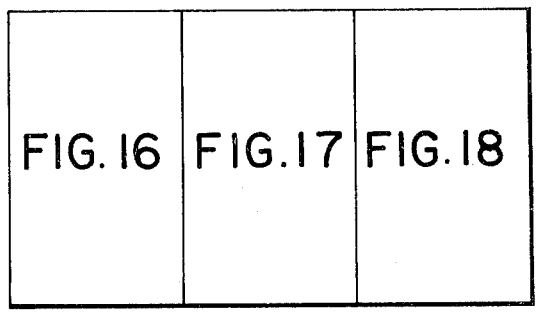
F I G. 19
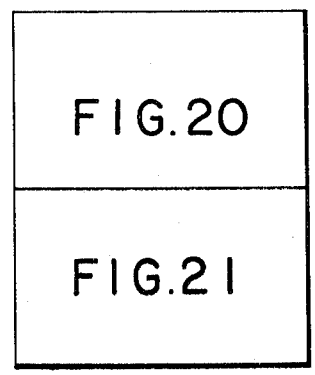

FIG. 18A

I  START

II  JUMP IF (BE) MEANS E.PSW

III  SET (MAP#PSWSW) TO (WARK2)

IV  JUMP IF (PSWSW) IS ODD

V  SET ZEROS TO (WARK2.SEL2.SECOND)

VI  SET ZEROS TO (WARK2.SEL1.SECOND)

VII  'BRT'(WARK2) WITH (ALOT1), AND SET THE RESULT TO (WARK2)

VIII  'FRM' (WARK2), AND SET THE RESULT TO (WARK1)

IX  SUBTRACT (ALOT1) FROM (WARK1)

X  ADD ONE TO (ALOT1)

XI  SET (MAP#PSWSW) TO (WARK2)

XII  JUMP IF (PSWSW) IS ODD

XIII  SET ZEROS TO (WARK2.SEL2.FIRST)

XIV  SET ZEROS TO (WARK2.SEL1.FIRST)

XV  'BRT'(WARK2) WITH (ALOT2), AND SET THE RESULT TO (WARK2)

XVI  'FRM' (WARK2), AND SET THE RESULT TO (WARK1)

XVII  SUBTRACT (ALOT2) FROM (WARK1)

XVIII  ADD ONE TO (ALOT2)

XIX  MULTIPLY (PSWSW) BY TWO, AND SET THE RESULT TO (WARK2)

FIG. 18 B

XX    SET (MAP#WARK2) TO (WARK3)

XXI    ADD ONE TO (WARK2)

XXII    SET (MAP#WARK2) TO (WARK2)

XXIII    SET (WARK3.SEL2.SECOND) TO (WARK2.SEL1.FIRST)

XXIV    'BRT' (WARK2) WITH (ALOT3), AND SET THE RESULT TO (WARK2)

XXV    'FRM' (WARK2), AND SET THE RESULT TO (WARK1)

XXVI    SUBTRACT (ALOT3) FROM (WARK1)

XXVII    ADD ONE TO (ALOT3)

XXVIII    SET (WARK1) TO (OLV)

XXIX    END. OLV FOUND

XXX    END. OLV NOT FOUND

NOTE 1) (AAA#BBB); ONE WORD WHICH IS GAINED FROM AAA BY BBB INDEXING 2) (CCC.DDD.EEE); THE BIT STRING OF CCC WHICH IS GIVEN BY EEE IN DDD FIELD
   FOR EXAMPLE, (WARK2.SEL1.FIRST) MEANS THE FOUR BIT STRING FROM BIT NO4 TO BIT NO7

3) 'BRT' SHOWS BITS ROTATE FUNCTION (SEE B.S.T.J, 43, P2086)
   FOR EXAMPLE, 'BRT' $\boxed{\phantom{x}|b_7|b_6|\cdots|b_0}$ WITH TWO,
   THEN THE RESULT IS $\boxed{\phantom{x}|b_5|b_4|\cdots|b_6}$

4) 'FRM' SHOWS RIGHT MOST ONE FUNCTION (SEE B.S. T.J, 43, P1869)

FOR EXAMPLE, 'FRM'  , THEN THE RESULT IS TWO WHICH SHOW BIT POSITION

IF ALL THE BIT STRING IS ZEROS, ENTRY TO NOT FOUND ROUTINE

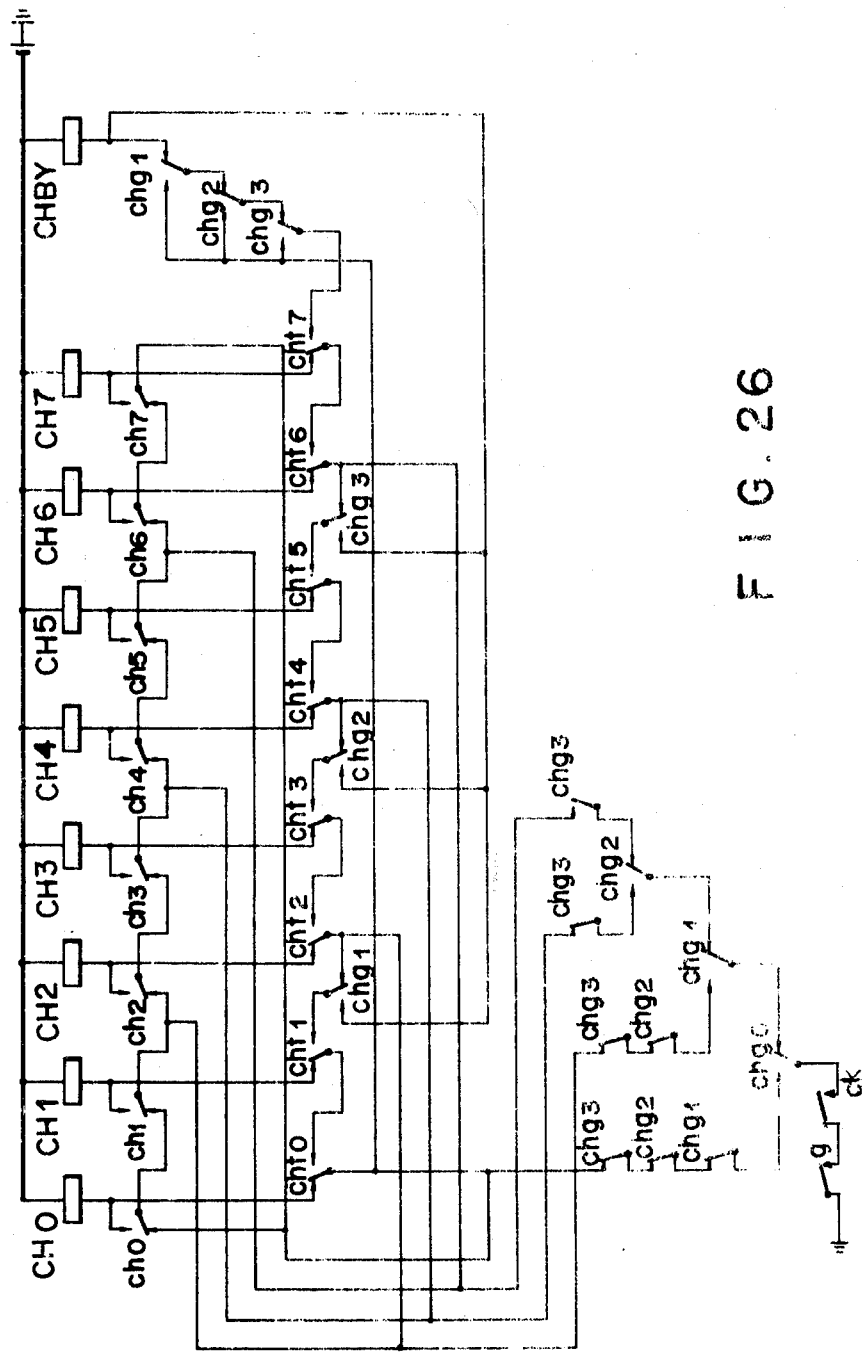
F I G. 26

FIG.32

| CONCENTRATION RATIO | CHANNEL SELECTION CIRCUIT | PRECEDENCE APPOINTMENT CIRCUIT | |
|---|---|---|---|
| 1.5:1 (3:2) | FIG.24 | FIG.25 | FIG.28 FIG.29 |
| 1.25:1 (5:4) 1.75:1 (7:4) | FIG.26 | FIG.27 | |
| 1.25:1 1.5:1 1.75:1 } COMMON | FIG.26 | FIG.30 | |

TELECOMMUNICATION SWITCHING SYSTEM

BACKGROUND OF THE INVENTION

1. Field of the Invention

This invention relates to a telecommunication switching system, and more particularly to a telecommunication switching system which is suitable for use as an electronic switching system or a crossbar switching system.

2. Description of the Prior Art

An ordinary telecommunication switching system employs a matrix or matrixes for switching in a switching network. The matrix has theoretically or physically fixed numbers of inlets and outlets, and the ratio of the numbers of the inlets and outlets in the single matrix or the plural matrixes combined together is called the concentration ratio.

A variety of concentration ratios are required to comply with the particular construction of the telecommunication switching system used.

Conventional methods that have heretofore been employed are as follows:

(a) A matrix having a required concentration ratio is newly designed. For example, in the case of the concentration ratio being 3:2, a new matrix (1) is manufactured to have twelve inlets (2) and eight outlets (3), as shown in FIG. 1.

(b) Plural matrixes are combined together to obtain a matrix group having outlets, the number of which is an integral multiple of a required number of outlets. For instance, in the case of the concentration ratio 3:2, six matrixes (4), each having eight inlets (5) and eight outlets (6), are combined together to obtain a matrix group of which the number of inlets × the number of outlets is 24 × 16, as depicted in FIG. 2.

(c) A certain number of inlets are of no use. For example, in the case of the concentration ratio 3:2, two matrixes (7), each having eight inlets (8) and eight outlets (9), are combined together, and are operated as a matrix so that the number of inlets × the number of outlets is 12 × 8, with four inlets held redundant, as illustrated in FIG. 3.

(d) Two kinds of matrixes are combined together. For instance, in the case of the concentration ratio 3:2, a matrix (10) having four inlets (11) and eight outlets (12), and a matrix (13) having eight inlets (14) and eight outlets (15), are combined together to obtain a matrix group so that the number of inlets × the number of outlets is 12 × 8, as shown in FIG. 4.

The abovesaid method (a) is uneconomical and time-consuming. The method (b) has the following defects: In the case of applying the matrix group to a multistage switching network of more than one stage, an increase in the traffic capacity of the switching network is not in proportion to an increase in the number of cross-points, and a decrease in the traffic capacity per cross-point is inevitable, and since this matrix group has $k$ ($\geq 2$) links between each primary matrix and each secondary matrix, the link matching method must be changed. The method (c) is uneconomical because some inlets must be held redundant. The method (d) requires two kinds of matrixes, and hence is economically unfavorable in the preparation of spare parts and in the other maintenance. Besides, it is also possible to prepare two kinds of matrixes of the same number, for example, one kind having sixteen inlets and eight outlets, and the other having eight inlets and eight outlets. But this is not preferred because of unbalanced service between the matrixes of different kinds.

Further, in the case of hunting the outlets of the matrix, since it is desirable from the viewpoint of reliability that the cross points be used uniformly, all the outlets selectable by each inlet may be customarily hunted in accordance with a "random hunting" principle. However, when such outlet hunting principle is applied to the hunting of outlets of multiple connection adopted in this invention, the traffic characteristics of the second matrix group is markedly degraded as compared with the traffic characteristics of the first matrix group, with the result that required traffic characteristics cannot be obtained. These problems will become more apparent from the following detailed description of this invention.

SUMMARY OF THE INVENTION

One object of this invention is to provide a telecommunication switching system which has a switching network constructed to have a desired concentration ratio only by combining together a plurality of matrixes of one kind.

Another object of this invention is to provide a telecommunication switching system which has a switching network of a desired concentration ratio constructed by combining together a plurality of matrixes of one kind, and which, even in the case of the switching network being constructed in a multistage form, does not require changing of the link matching method, nor does it cause a decrease in the traffic capacity per cross-point as in the case where a newly designed exclusive matrix is used. In other words, the teaching of this invention provides for enhanced traffic characteristics, i.e. excellent distribution of the number of busy links and call congestion ratio by use of a novel "outlet hunting" network in the switching network including a matrix group of multiple connection.

Still another object of this invention is to provide a telecommunication switching system which has a switching network formed by combining together a plurality of matrixes of one kind to have a desired concentration ratio and designed not to have redundant inlets.

The abovesaid objects are achieved by a telecommunication switching system which comprises a first matrix group formed by a plurality of matrixes of one kind, a second matrix group formed by a plurality of matrixes of the same kind as the first matrix group, and an outlet hunting device. According to the invention, the first matrix group includes outlets of non-multiple connection, i.e. the first outlets, and outlets of multiple connection, i.e. the second outlets, while the second matrix group includes only second outlets multiple-connected to the second outlets of the first matrix group, and the outlet hunting device is adapted to start outlet hunting with the first outlets when an idle outlet exists.

BRIEF DESCRIPTION OF THE DRAWINGS

FIG. 5 is a block diagram of the principal part of a basic switching network according to the invention;

FIGS. 13 and 14 are diagrams explanatory of the correspondence between outlets and links;

FIG. 15 is a view showing the arrangement of FIGS. 16 to 18;

FIGS. 18A, 18B and 18C are "key" diagrams explanatory of the Roman numeral designators utilized in the flow charts of FIGS. 17 and 18;

FIG. 19 is a view showing the arrangement of FIGS. 20 and 21;

FIG. 26 is a circuit diagram of a channel selection circuit in the cases of concentration ratios of 3:2, 5:4 and 7:4;

FIG. 32 is a view showing the arrangement of the circuits with the figure numbers.

DESCRIPTION OF THE PREFERRED EMBODIMENTS

Figure 1:
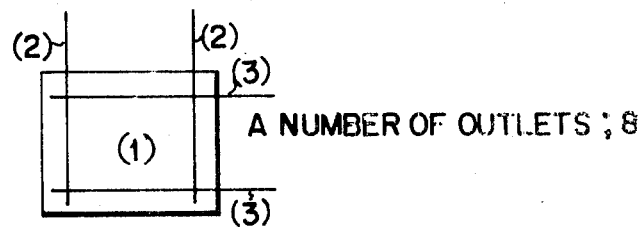
FIGS. 1 to 4 are block diagrams respectively illustrating the principal parts of conventional systems.
Figure 2:
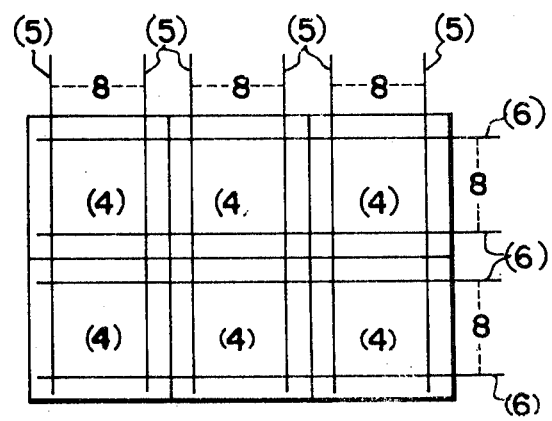
Figure 3:
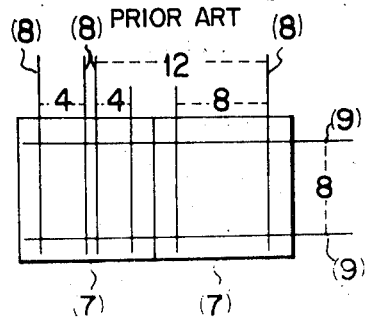
Figure 4:
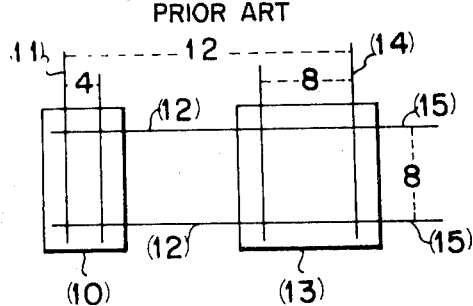

FIG. 5 shows in a block form the principal part of a basic switching network in this invention.

In FIG. 5, reference numeral 16 indicates individual matrixes; 17 designates inlets; 18 identifies a first matrix group including outlets of non-multiple connection and outlets of multiple connection in a predetermined ratio; 19 denotes a second matrix group including only outlets of multiple connection; 20 represents the first outlets of non-multiple connection; and 21 shows the second outlets of multiple connection.

Since this invention does not depend upon the number of inlets, the matrix used need not be limited specifically to a square one but, for convenience of representation of the concentration ratio, the following description will be given in connection with a square matrix having $n$ inlets and $n$ outlets.

Under the condition that the ratio of the first outlets 20 and the second outlets 21 of each matrix 16 of the first matrix group 18 is constant, this invention is applicable to the case of the concentration ratio being $1:m$ ($2m>1>m$, $m$ being a positive divisor of $n$ and larger than unity and, in some cases, equal to $n$, and $l$ being an positive integer).

Each matrix 16 belonging to the first matrix group 18 has $n/m \times (l-m)$ outlets of multiple connection. The outlets are multiple-connected in groups of $n/m$ outlets to $n/m$ outlets of each matrix 16 of the second matrix group 19.

The construction shown in FIG. 5 is also applicable to multistage switching networks of more than one stage. That is, the multistage switching network of more than one stage requires at least a path from an arbitrary one of the primary matrixes to an arbitrary one of the secondary matrixes in many cases. In the case of the complete link connection, that is, in the case where the same number of links are provided between each primary matrix and each secondary matrix, correspondence of the outlets of the primary matrix to the secondary matrixes can be achieved by using the Latin square. For instance, in the case of one link between each primary matrix and each secondary matrix, the number of the secondary matrixes is $n$ and the outlets of an arbitrary one of the primary matrixes can be divided into $m$ sub-groups of $n/m$ outlets and, for the correspondence of the outlets to the secondary matrixes, it is sufficient only to know the corresponding relationship between the $m$ sub-groups of the outlets of each primary matrix and $m$ secondary matrix groups, each including $n/m$ secondary matrixes. To this end, $m$ symbols 0, 1, 2, ... and $m-1$ are assigned to the $m$ sub-groups of outlets and the $m$ secondary matrix groups, by which is obtained an order-m Latin square where each symbol 0, 1, 2, ..., $m-1$ occurs exactly once in each row and column. The $m$ sub-groups of outlets of each the $m$ matrixes belonging to the first matrix group 18 have one-to-one correspondence to each row of the order-m Latin square, and are connected to the $m$ secondary matrix groups of the symbols written in the respective rows. The $m$ sub-groups of outlets of each of (l-m) matrixes belonging to the second matrix group 19 have one-to-one correspondence to arbitrary (l-m) columns of the order-m Latin square, and are connected to the $m$ secondary matrix groups of the symbols written in the respective columns. In this manner, an arbitrary primary matrix has a path to an arbitrary secondary matrix and the construction depicted in FIG. 5 is also applicable to multistage switching networks.

The outlet hunting in the system of this invention is achieved basically in the following manner: The first outlets 20 are hunted earlier than the second outlets 21. This hunting is called the precedence selection of the first outlets. In the first outlets 20 or the second outlets 21, random hunting is carried out.

The abovesaid random hunting is such a method of selection that in the case of hunting for an idle one of outlets or links, the precedence of the outlets or links becomes equal for every outlet or link or every group of outlets or links.

Where the uniform use of the cross-points is not required, the traffic characteristics can be further enhanced by hunting the second outlets 21 so that the outlets hunted earlier in the first matrix group 18 are hunted later in the second matrix group 19.

Figure 7:
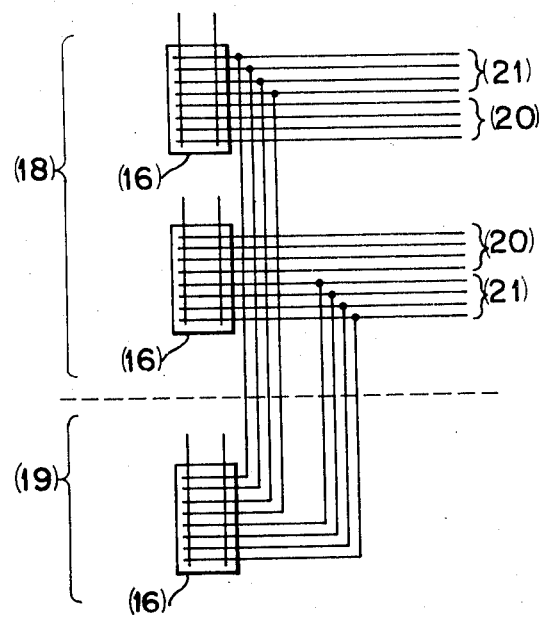
FIG. 7 is a diagrammatic representation of an embodiment of the invention in the case of a concentration ratio 3:2.
Figures 6, 6A:
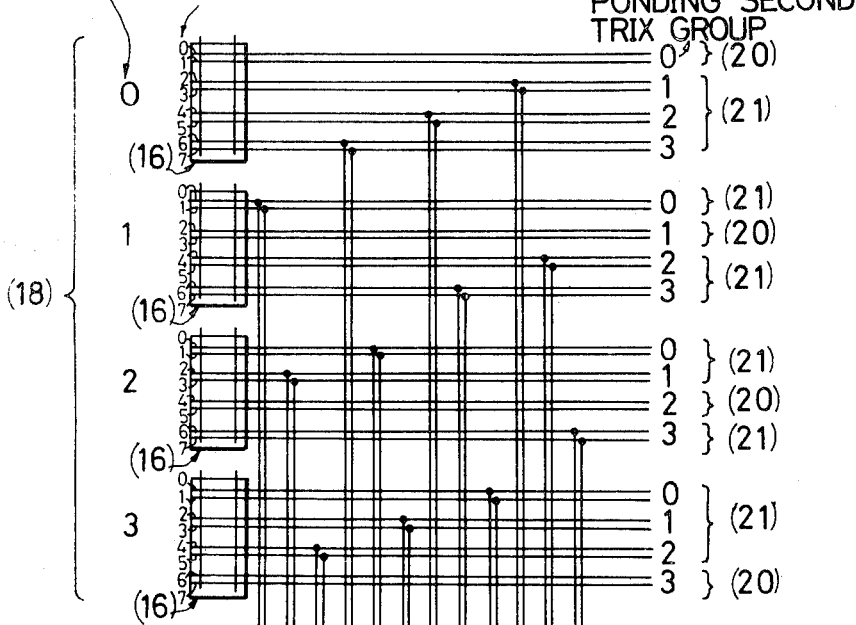
FIG. 6 is a diagrammatic representation of an embodiment of the invention in the case of a concentration ratio 7:4.
FIG. 6A is a Latin square diagram used to achieve correspondence of the outlets of the primary matrix to the secondary matrixes, according to the invention.

Referring next to FIGS. 6 and 7, a description will be given of embodiments of this invention in the cases of concentration ratios 7:4 and 3:2.

FIG. 6 shows the embodiment of this invention in the case of the concentration ratio 7:4. In FIG. 6, parts corresponding to those described previously with regard to FIG. 5 are indicated by the same reference numerals.

In the present embodiment, correspondence of the outlets of the primary matrix to the secondary matrixes is achieved by using the Latin square shown in FIG. 6A. In this case, the ratio of the first and second outlets 20 and 21 in the first matrix group 18 is 1:3, and the outlets of each matrix of the second matrix group 19 are multiple-connected two-by-two to the outlets of each matrix of the first matrix group 18. The accomodation levels of the first outlets 20 in the first matrix group 18 are shifted in such a manner that the levels 0 and $V_1$ are at the matrix number $V_0$, the levels 2 and 3 at the matrix number 1, the levels 4 and 5 at the matrix number 2, and the levels 6 and 7 at the matrix number 3, by which the ratio of the non-multiple-connection outlets and the multiple-connection outlets, which are the inlets of each secondary matrix, is constant, with paths from each primary matrix to all of the secondary matrixes secured.

FIG. 7 shows the embodiment of this invention in the case of the concentration ratio 3:2. Also in FIG. 7, parts corresponding to those described previously in connection with FIG. 5 are marked with the same reference numerals.

The present embodiment is simpler in construction than any other embodiment of this invention. In this case, the switching network is formed by using, as a unit, the structure of FIG. 7 in accordance with the number of matrixes of the first matrix group 18. In the case of the first matrix group 18 including eight matrixes as described later, the switching network is formed with four structures of FIG. 7 and the number of matrixes of the second matrix group 19 is four.

Turning now to FIGS. 8 to 21, this invention will be described as being applied to an electronic switching system. The term "link" herein used is equivalent to the channel in a crossbar switching system, but will be used according to usage in the field of electronic switching systems.

Figure 8:
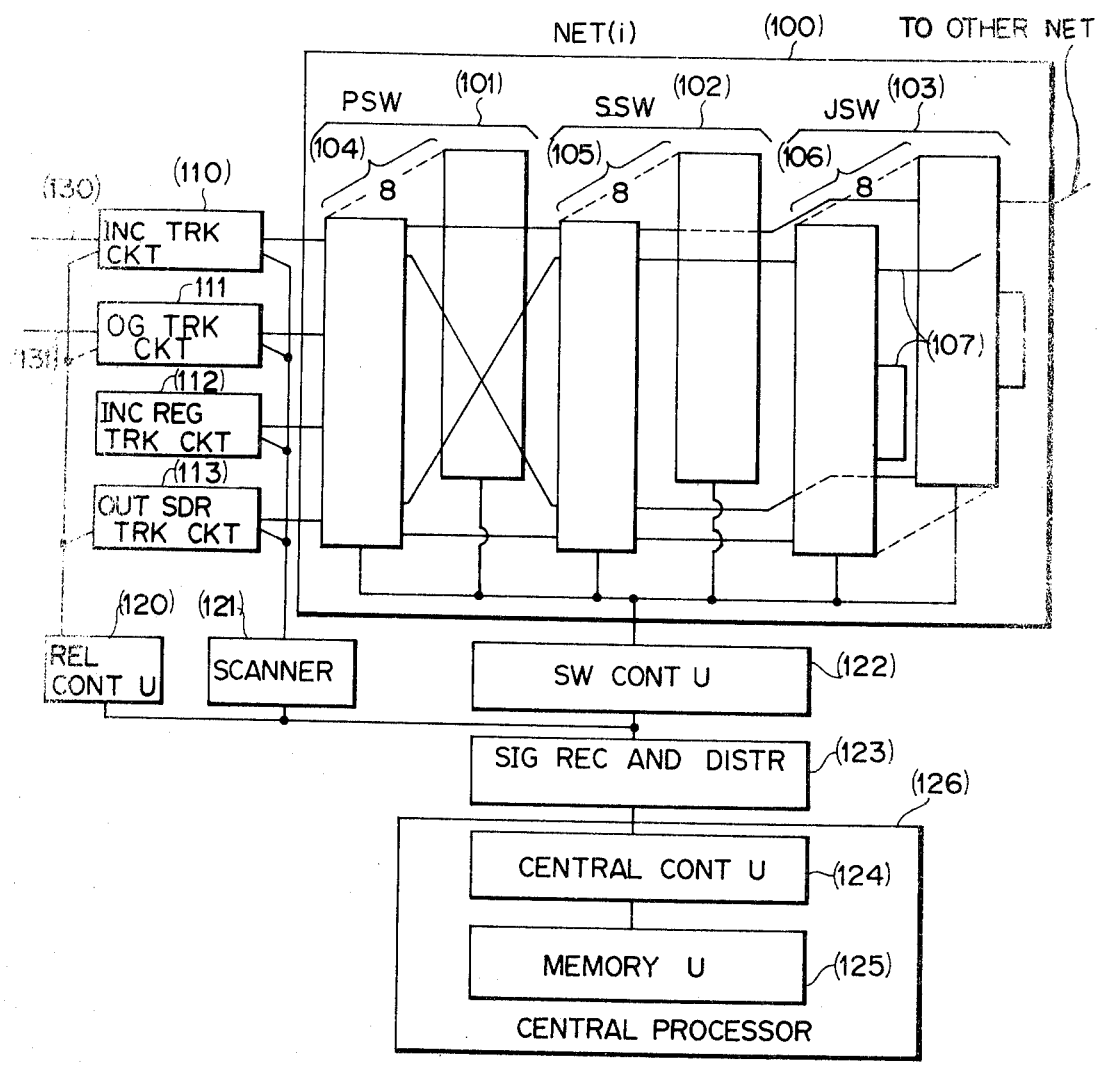
FIG. 8 is a block diagram showing the principal part of an electronic switching system embodying this invention.

FIG. 8 illustrates in block form an electronic switching system with stored program control which achieves space division transit switching.

In FIG. 8, reference numeral 100 indicates, for example, an ith network; 101 designates primary switches PSW; 102 identifies secondary switches SSW; 103 denotes junctor switches JSW (where switch is a physical representation of matrix); 104 to 106 represent grids; 107 shows junctors; 110 refers to incoming trunk circuits; 111 indicates outgoing trunk circuits; 112 designates incoming register trunk circuits; 113 identifies outgoing sender trunk circuits; 120 denotes a relay control unit; 121 represents a scanner; 122 shows a switch control unit; 123 refers to a signal receiver and distributor; 124 indicates a central control unit; 125 designates a memory unit; 126 identifies a central processor composed of the central control unit 124 and the memory unit 125; and 130 and 131 denote speech lines.

In this system, the speech line 130 for terminating calls from other switching systems and the speech line 131 for originating calls to the other switching systems are connected to the network through the incoming trunk circuit 110 and the outgoing trunk circuit 111, respectively, and a call from a certain incoming trunk circuit 110 is connected to a desired outgoing trunk circuit 111 through the network 100, achieving a switching operation. The basic facility of such an electronic switching system with stores program control is disclosed in an article relative to the No. 1 ESS switching system developed by Bell Laboratories, Inc. (B. S. T. J., Vol. 43, P.1837). The basic control method of the embodiment shown in FIG. 8 is the same as the abovesaid No. 1 ESS switching system.

That is, the system of this embodiment has the memory unit 125 for storing programs and data to be referred to by their programs, and the central control unit 124 for executing the programs with logic circuits, and carrying out the switching operation by controlling the trunk circuits 110 and 111 and the network 100 through the signal receiver and distributor 123, the relay control unit 120, the scanner 121 and the switch control unit 122. Next, the sequence of the switching operation will be described.

At first, when an incoming trunk circuit 110 has received a call from another station, the central processor 126 detects the incoming call from the other station through scanner 121. Then, the central control unit 124 selects a certain idle incoming register trunk circuit 112, and further hunts for a path through the network 100 interconnecting the incoming trunk circuit 110 and the incoming register trunk circuit 112, thus forming a path interconnecting the incoming trunk circuit 110 and the incoming register trunk circuit 112 through the switch control unit 122. Next, a directory number code supplied from the speech line 130 is received by the central processor 126 through the incoming register trunk circuit 112 and the scanner 121. The central processor 126 analyzes the directory number code, hunts the outgoing trunk circuit 111 and the outgoing sender trunk circuit 113 for transmission to a required one of the other switching systems, releases the incoming register trunk circuit 112 and the path between the incoming trunk circuit 110 and the incoming register trunk circuit 112, hunts for a path between the incoming trunk circuit 110 and the outgoing trunk circuit 111 and a path between the outgoing trunk circuit 111 and the outgoing sender trunk circuit 113, and connects the latter path through the switch control unit 122. After this, the directory number code already received through the incoming register trunk circuit 112 is sent out through the relay control unit 120 and the outgoing sender trunk circuit 113. Then, the outgoing sender trunk circuit 113 and the path between the outgoing trunk circuit 111 and the outgoing sender trunk circuit 113, which have become unnecessary, are released, and the path between the incoming trunk circuit 110 and the outgoing trunk circuit 111, already hunted, is connected by the central processor 126. Finally, termination of the call is detected by the central processor 126 through the incoming trunk circuit 110 and the scanner 121, and the processor 126 releases the outgoing trunk circuit 111 and the path between the incoming trunk circuit 110 and the outgoing trunk circuit 111 at the same time, thus restoring the switching system to its original state.

Now, a further description will be made of the network 100 which provides the speech path. The number of networks 100 under the control of one central processor 126 is usually more than one, and in this embodiment it is one at minimum and eight at maximum. Each network is composed of three stages of space division crossbar switches. That is, the network comprises the primary switches 101, the secondary switches 102 and junctor switches 103 which achieve connections with the other networks and reversings in the network itself. The inlets of the primary switches 101 are connected to the incoming trunk circuits 110, the outgoing trunk circuits 111, the incoming register trunk circuits 112 and the outgoing sender trunk circuits 113. The outlet terminals of the primary switches 101 are connected to the inlet terminals of the secondary switches 102. The outlet terminals of the secondary switches 102 are connected to the inlet terminals of the junctor switches 103, the outlet terminals of which are in turn connected to the outlets of other junctor switches 103. The primary switches 101, the secondary switches 102 and the junctor switches 103 are respectively formed with eight grids 104, 105 and 106.

Figure 9:
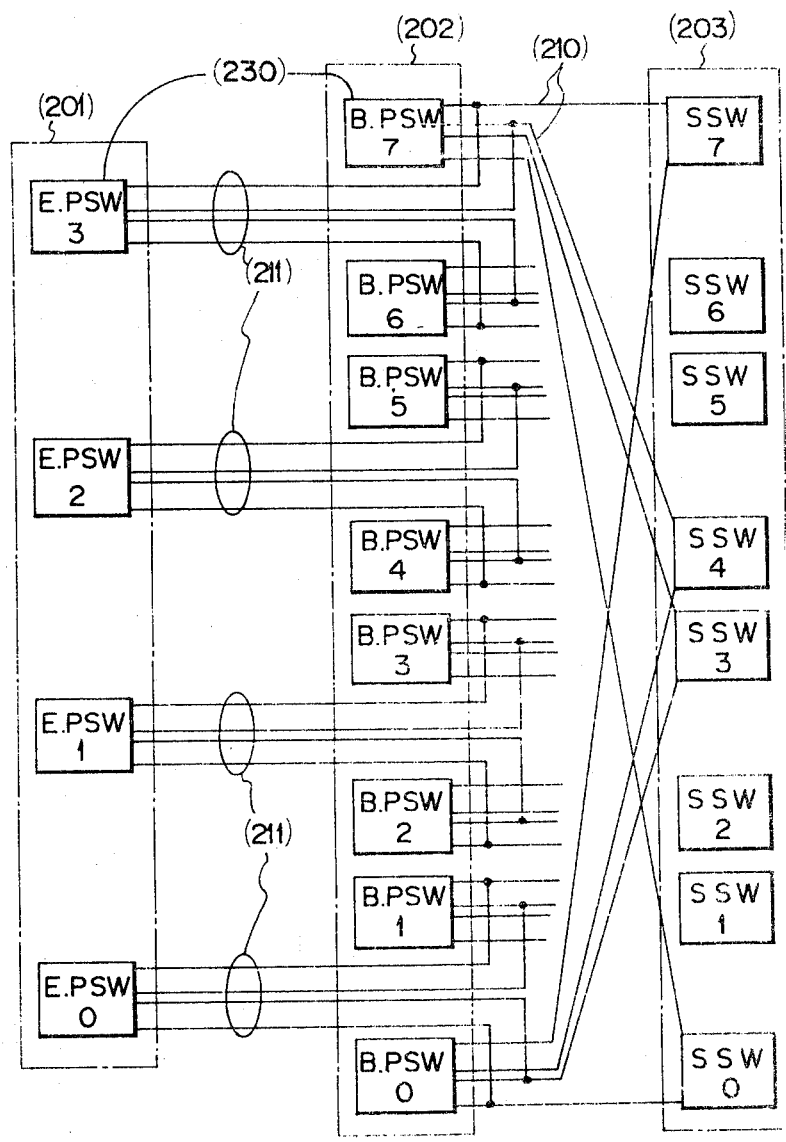
FIGS. 9 to 11 are block diagrams, each illustrating the principal part of a switching network for use in the electronic switching system shown in FIG. 8.
Figure 10:
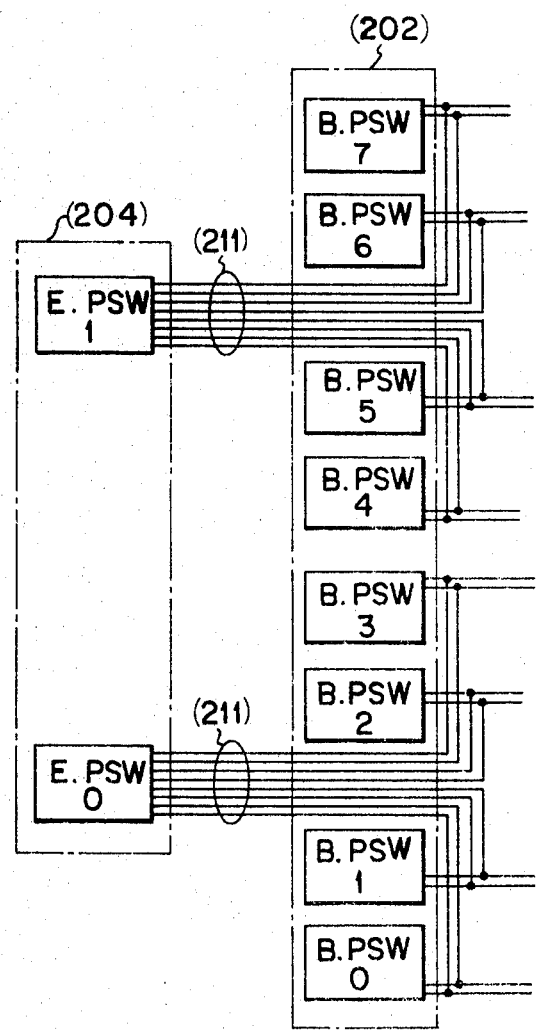
Figure 11:
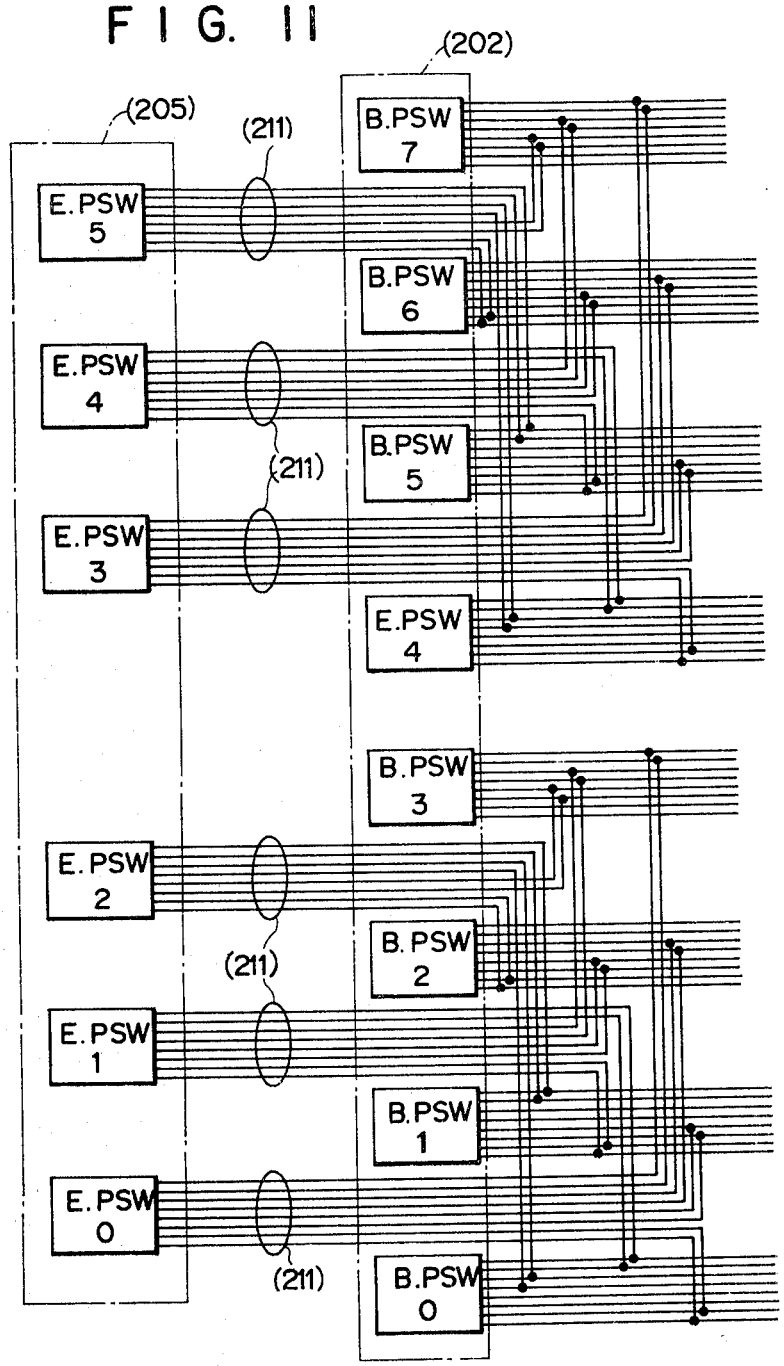

FIGS. 9 to 11 respectively show in block form the principal parts of the switching network for use in the electronic switching system embodying this invention. FIG. 9 shows the case of the concentration ratio being 1.5:1(3:2 in the description of FIG. 5), FIG. 10 the case of the concentration ratio being 1.25:1 (5:4), and FIG. 11 the case of the concentration ratio being 1.75:1(7:4)

The illustrated circuits each comprise one of the grids 104 of the primary switches 101 and one of the grids 105 of the secondary switches 102 as previously described with respect to FIG. 8.

In FIGS. 9 to 11, reference numerals 201, 204 and 205 indicate extension primary switches (E.PSW); 202 designates basic primary switches (B.PSW); 203 identifies secondary switches; 210 denotes links; and 211 represents cross-frame wires.

Each grid of the primary switches 101 of FIG. 8 comprises any one of the extension primary switches 201, 204 and 205 and the basic primary switches 202 of FIG. 9, 10 and 11. Each grid of the secondary switches 102 of FIG. 8 comprises the secondary switches 203 of FIG. 9 only. A crossbar switch 230 forming each matrix group is a matrix having eight inlets and eight outlets. The basic primary switches 202 and the secondar switches 203 may be the same regardless of the concentration ratio, and the former and the latter are each composed of eight matrixes, which are numbered consecutively 0 to 7, and which will hereinafter be referred to as B.PSW0, B.PSW1, B.PSW2, ... or SSW0, SSW1, SSW2, .... Wiring of the basic primary switches 202 and the secondary switches 203 is effected so that each matrix of the basic primary switches 202 is connected to the eight matrixes of the secondary switches 203 through the links 210. For example eight outlets of B.PSW0 are each connected one-by-one to an inlet of each matrix of eight matrixes SSW0, SSW1, SSW2, ... , and SSW7. The number of matrixes needed for each of the extension primary switches 201, 204 and 205 of FIGS. 9, 10 and 11 varies with the concentration ratio desired. For example, the number of matrixes needed for each of the extension primary switches 201 and necessary for the concentration ratio 1.5:1(3:2) is four; the number of matrixes of the extension primary switches 204 for the concentration ratio 1.25:1(5:4) is two; and the number of matrixes of the extension primary switches 205 for the concentration ratio 1.75:1(7:4) is six. The matrixes of each of the extension primary switches 201, 204 and 205 are consecutively numbered 0, 1, ... as in the case of the basic primary switches 202, and will hereinafter be referred to as E.PSW0, E.PSW1, .... The outlets of the extension primary switches 201 are multiple-connected to the links 210 through the cross-frame wires 211. This connection is required to be such that, in the case of the concentration ratio 1.5:1(3:2), the outlets of each matrix of the extension primary switches 201 are connected in two groups as shown in the FIG. 7 embodiment of this invention, and such that, in the cases of the concentration ratios 1.25:1(5:4) and 1.75:1(7:4), the outlets of each matrix of the extension primary switches 204 are connected in four groups.

Figure 12:
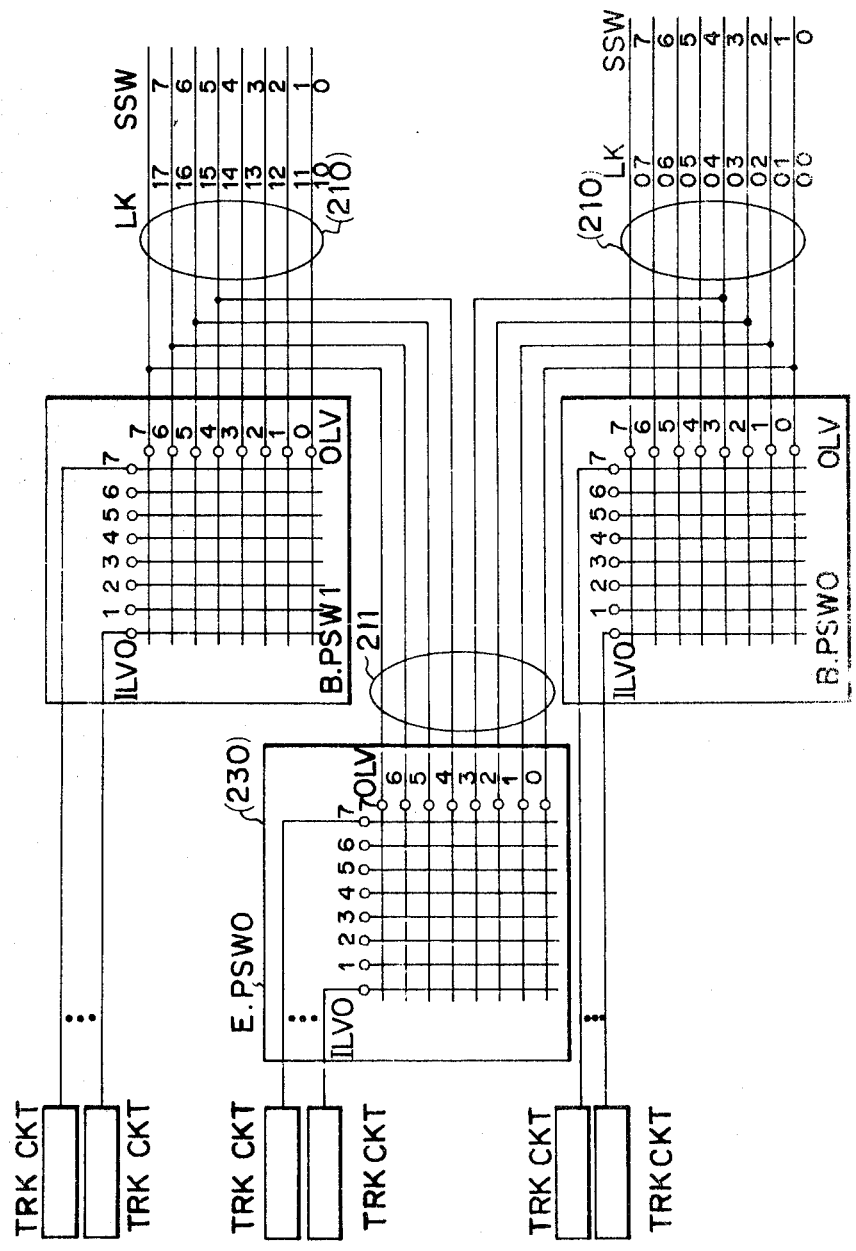
FIG. 12 is a diagram explanatory of a link configuration.

Reference will be made to FIG. 12 for a detailed description of the connection of the links 210 and the cross-frame wires 211 in the case of the concentration ratio 1.5:1(3:2).

FIG. 12 shows in detail the links 210 of each matrix of B.PSW0 and B.PSW1 in the basic primary switches 202 and E.PSW0 in the extension primary switches 201. In FIG. 12, a symbol ILV is used for designating eight inlets of the matrix, and the inlets will hereinafter be referred to as ILV0, ILV1, ... and ILV7 respectively. Similarly, a symbol OLV is used for designating eight outlets of the matrix and the outlets will hereinafter be referred to as OLV0, OLV1, ... and OLV7, respectively. Each inlet is connected to a trunk circuit (TRK CKT) such as described previously in connection with FIG. 8, and the outlets are each connected through the link 210 to the secondary switches 203 formed with eight matrixes, as already described. In this case, the outlets OLV0 to OLV7 are respectively connected to the switches SSW0 to SSW7 of the secondary switches 203. Accordingly, the symbol for identifying each link 210 can be obtained with the combination of the matrix number of the basic primary switch and the secondary switch. For instance, the symbol of the link between B.PSW0 and SSW0 is LINK00 and the symbol of the link between B.PSW1 and SSW7 is LINK17. The multiple connection of the eight outlets of each matrix of the extension primary switches to the links 210 are effected, with the numbers indicated by the outlet symbols OLV held corresponding to the matrix numbers of the secondary switches. For instance, in the case of the concentration ratio 1.5:1(3:2), the eight outlets of E.PSW0 are divided into two groups, and multiple-connected to links from two matrixes of the basic primary switches. OLV0 of E.PSW0 is multiple-connected to LINK00 leading to SSW0, and OLV4 of E.PSW0 is multiple-connected to LINK14 leading to SSW4.

FIGS. 13 and 14 show the corrrespondence between each outlet and the link member in the basic primary switches and the extension primary switches, respectively, in the cases of the concentration ratios 1.5:1(3:2), 1.25:1(5:4) and 1.75:1(7:4). That is, link configurations 300, 302 and 304 in FIG. 13 show the link numbers when the B.PSW number and the OLV number correspond to each other in the cases of the concentration ratios 1.5:1(3:2), 1.25:1(5:4) and 1.75:1(7:4), respectively. For instance, the outlet OLV5 in B.PSW4 is LINK45. Link configurations 301, 303 and 305 in FIG. 14 similarly show the link numbers when the E.PSW number and the OLV number correspond to each other in the cases of the concentration ratios 1.5:1(3:2), 1.25:1(5:4) and 1.75:1 (7:4), respectively. For example, in the link configuration 301, for the concentration ratio 1.5:1(3:2), the outlet OLV2 of E.PSW3 is multiple-connected to LINK62. In the link configuration 305, for the concentration ratio 1.75:1(7:4), the outlet OLV5 of E.PSW4 is multiple-connected to LINK75. In the link configurations 300, 302 and 304 of FIG. 13, to facilitate discrimination between the non-multiple-connected links and the multiple-connected ones, the latter links are surrounded with thick lines indicated by 310.

Figure 16:
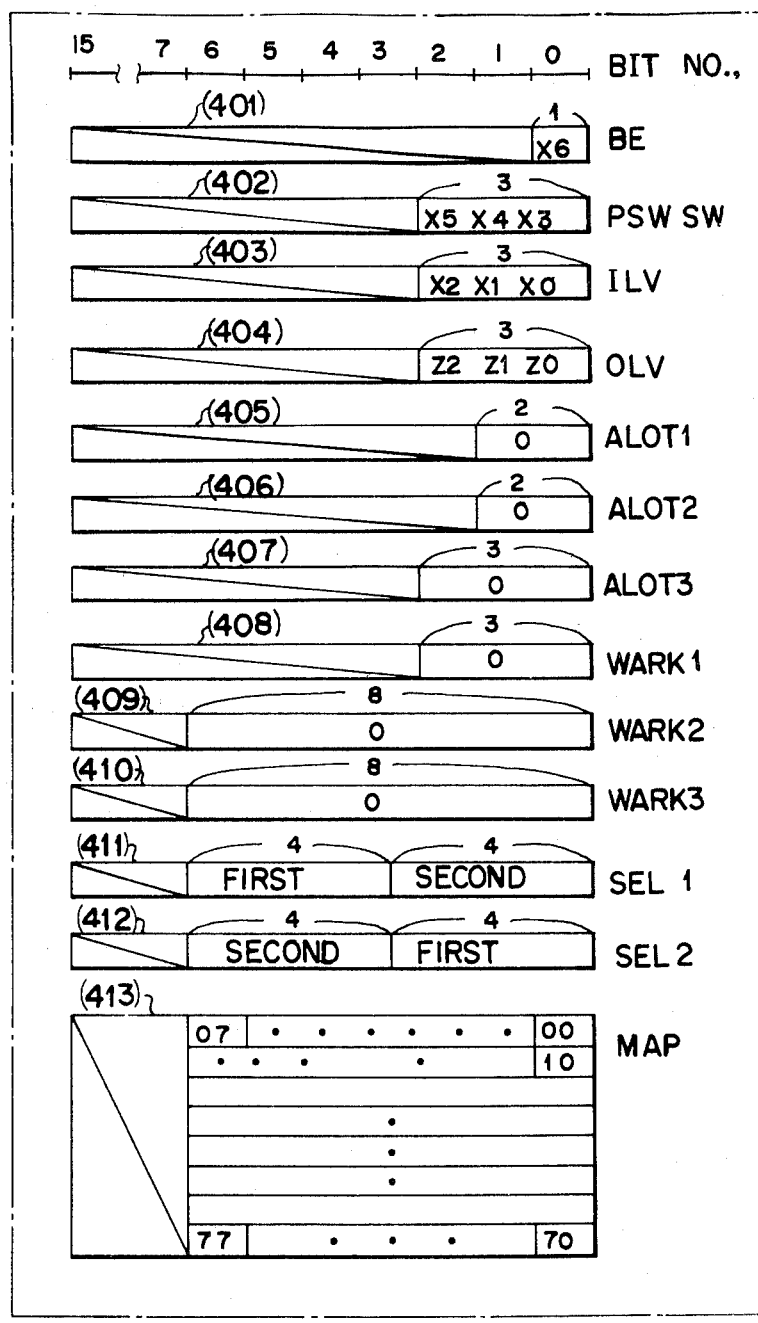
FIG. 16 is a diagrammatic representation of the organization of the central processor shown in FIG. 8.
Figure 17:
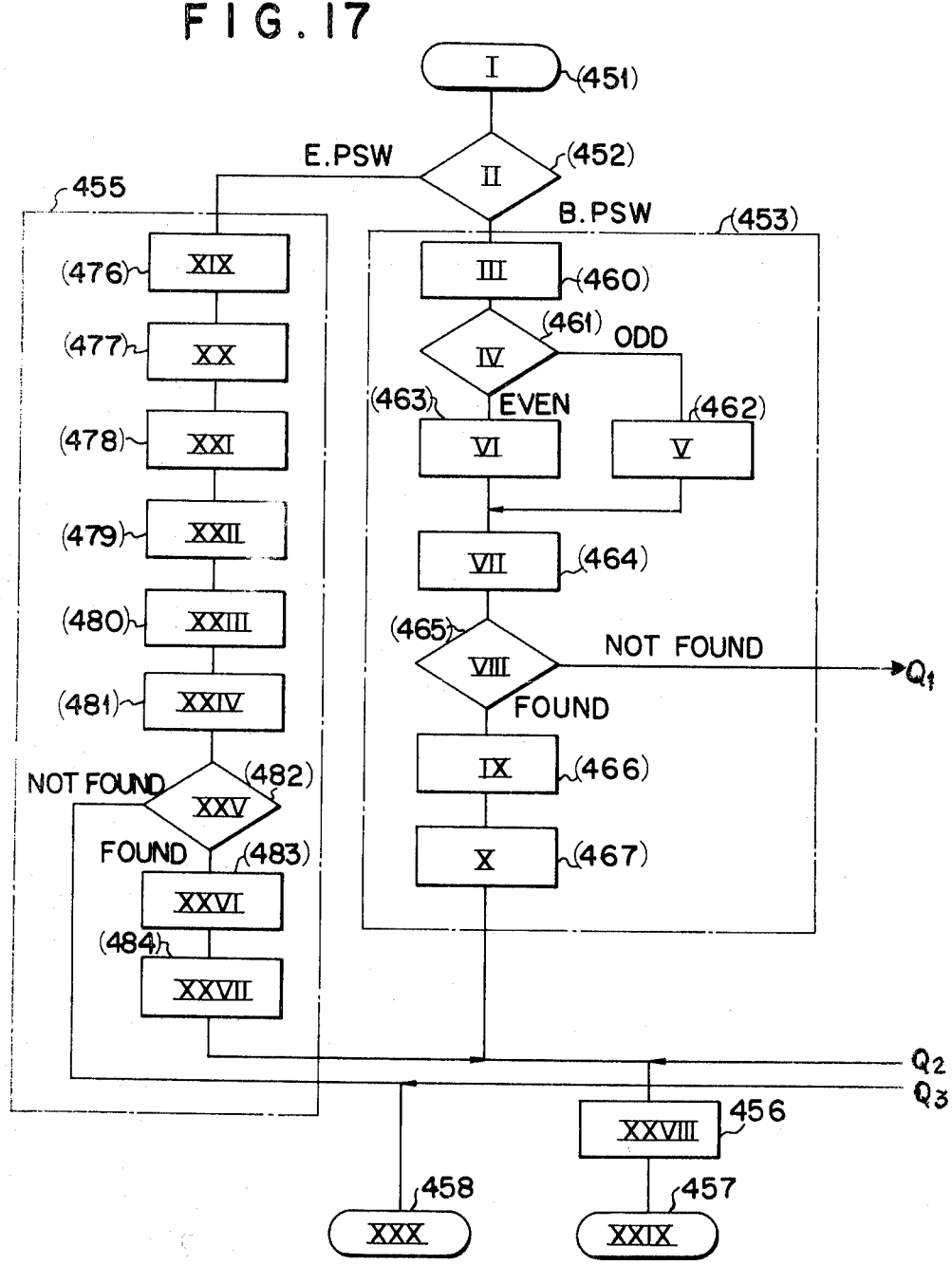
FIGS. 17 and 18 are flow chart diagrams explanatory of the operation of the central processor of FIG. 8.
Figure 18:
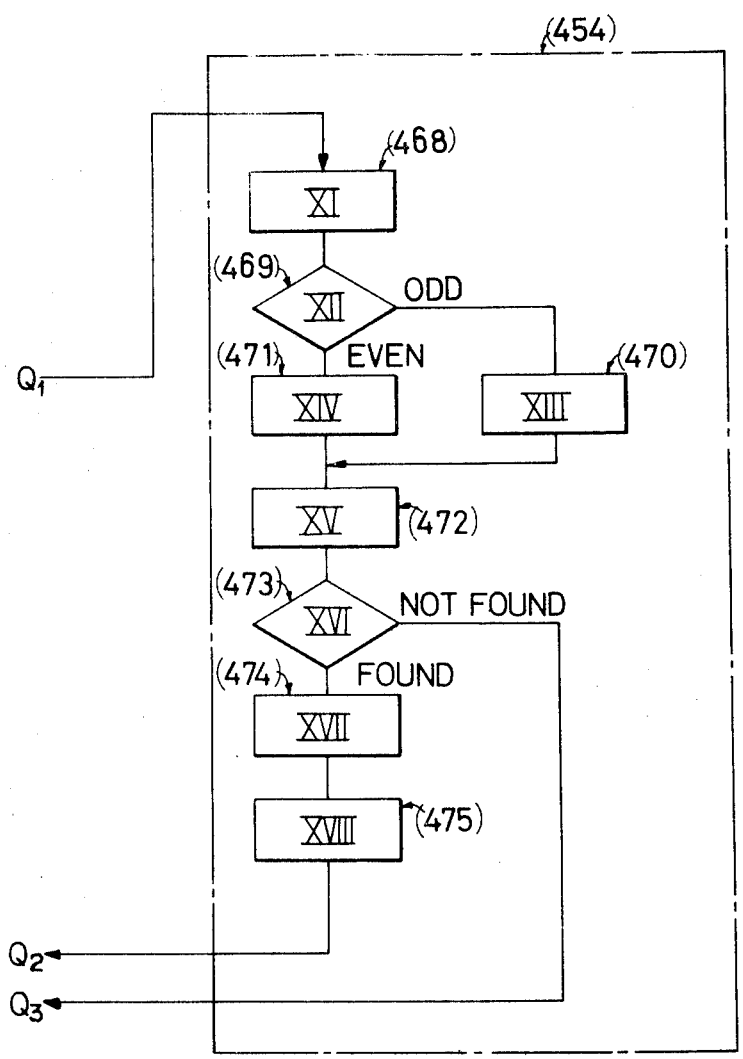

FIG. 15 shows the arrangement of FIGS. 16 to 18. FIG. 16 to 18 are explanatory of the procedure for execution by the central processor 126 shown in FIG. 8.

The procedure is to select the above-described link from a specified one of the inlets of the basic primary switches, or the extension primary switches, and by this execution, the link number is determined. In the selection of the link number for determining any one of the outlets OLV0 to OLV7 of the matrixes of the basic primary switches, the links of multiple connection, (that is, the second outlets described previously in connection with the fundamental matters of this invention,) are selected after the links of non-multiple connection, (i.e. the first outlets), and in each of the first and second outlets, random hunting is carried out. Further, in the selection of the link number for determining any one of the outlets OLV0 to OLV7 of the matrixes of the extension primary switches, random hunting is carried out in the outlets.

Figure 18C:
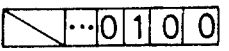

The central processor 126 comprises the memory unit 125 and the central control unit 124, as referred to previously, relative to FIG. 8, and the procedure involves use of the data of FIG. 16 by the programs of FIGS. 17 and 18. FIGS. 18A, 18B and 18C show the contents of the program and emphasize matters that demand special attention in the programs and data.

The following description will be given first in connection with the procedure for link hunting concerning the link configurations 300 and 301 for the concentration ratio 1.5:1(3:2), shown in FIGS. 13 and 14, and then with regard to alteration of the procedure in the cases of the other concentration ratios.

The data shown in FIG. 16 are formed with a wordlength of less than 16 bits in the present example. Data 401, 402 and 403 are used as input information in the program shown in FIGS. 17 and 18, and are used as information necessary for designating the inlet of the trunk circuits shown in FIG. 12. The datum 401 is to store one bit $X_6$ for designating either the extension primary switch or the basic primary switch, and will hereinafter be referred to as the BE datum 401. The datum 402 is to store three bits $X_5$, $X_4$ and $X_3$ indicating the PSW number of the extenson primary switch or the basic primary switch, and will hereinafter be referred to as the PSWSW datum 402. The datum 403 is to store three bits $X_2$, $X_1$ and $X_0$ indicating the ILV number of the extension primary switch or the basic primary switch, and will hereinafter referred to as the ILV datum 403. A datum 404 is to store the OLV number, i.e. information which will be the output to be obtained by the program of FIGS. 17 and 18, and this datum will hereinafter be referred to as the OLV datum 404. Data 405, 406 and 407 are alloters for achieving random hunting of the OLV number in the program of FIGS. 17 and 18. That is, to say the datum 405 is to effect random hunting of the first outlets, and will hereinafter referred to as the ALOT1 datum 405; the datum 406 is to perform random hunting of the second outlets, and will hereinafter be referred to as the ALOT2 datum 406; and the datum 407 is to achieve random hunting of the outlets of the extension primary switch, and will hereinafter be referred to as the ALOT3 datum 407. Data 408, 409 and 410 are employed for temporary or reserve storage which is needed in the execution of the program of FIGS. 17 and 18, and these data will hereinafter be referred to as the WARK1 datum 408, WARK2 datum 409 and WARK3 datum 410, respectively. Data 411 and 412 are to achieve field definition which is often employed in the electronic switching system with stored program control; and they are also disclosed in the aforesaid B.S.T.J., vol. 43, p.2566, FIG. 14, and designate a specified bit string in a certain word, as is evident from the note in FIG. 18B. Two kinds of field definitions are required for selection appointment. The definitions data 411 and 412 perform these field definitions and, for the sake of clarity, will hereinafter be referred to as the SEL1 datum 411 and the SEL2 datum 412. A datum 413 is to indicate the busy or idle state of the link by means of the identity of a bit corresponding to the link number, and will hereinafter be referred to the MAP datum 413. The bit configuration in the MAP datum 413 is conformed to the link configuration 300 in FIG. 13, and the numbers in the MAP datum 413 indicate the link numbers.

The bits indicated by slant symbols in the data shown in FIG. 16 means that their contents are not used in the program shown in FIGS. 17 and 18.

In the program of FIGS. 17 and 18, flow chart symbols are based on ISO Recommendation, ISO/R/1028-1969. With the data 401, 402 and 403 of FIG. 16, execution of the program starts from the procedure starting point START. (FIG. 17 and 18A). Since the steps in each block of the flow chart of FIGS. 17 and 18 cannot be shown in the respective block on the same sheets, they are shown as roman numeral designators in FIGS. 17 and 18, and a key is provided in FIGS. 18A to 18C.

In the selection concerning the basic primary switch, as a result of the identification of the BE datum 401 of FIG. 16, the program selects an idle link of the first outlets in accordance with a first outlet hunting routine 453 of FIG. 17, and if no idle outlet is found, further selects an idle link of the second outlets in accordance with a second outlet hunting routine 454 of FIG. 18. In the selection concerning the extension primary switch, as a result of the identification of the BE datum 401 of FIG. 16, link number hunting is achieved in accordance with an extension primary switch link hunting routine 455 of FIG. 17. When one link number has been selected following the rountines 453, 454 and 455, the OLV number of the primary switch is set in the OLV data by a process symbol step 456, thus completing the processing. In the case where no idle link exists in the routines 453, 454 and 455, the absence of an idle link is indicated by a terminal step 458.

Now, the routines 453, 454 and 455 will be described in detail.

The first outlet hunting routine 453 and the second outlet hunting routine 454 are different from each other only in the data used for reference, but are otherwise identical in process. Accordingly, only the routine 453 will be described. That is, in a process or step 460, the WARK2 datum 409 of FIG. 16 is set for the link numbers which will be hunted by a retrieval from the MAP datum 413 and the PSWSW datum 402. Next, since links other than those indicated by the second outlet hunting symbol 310 in the link configuration, described previously with respect to FIG. 13 (that is, only the links corresponding to the first outlets) are to be hunted, the links corresponding to the second outlets are erased by a decision step 461 and further processes 462 or 463. As is apparent from NOTE3 in FIG. 18B, in order to achieve first outlet random hunting, in a process 464, bits are rotated with the ALOT1 datum 405 of FIG. 16, and an idle link is hunted for by a decision step 465 of FIG. 17. Where an idle link exists, its original link number is obtained by a process 466, and then the ALOT1 datum 405 of FIG. 16 is updated by a process 467 of FIG. 17. Where no idle link is found by the decision 465, the process is executed in accordance with the routine 454. The routine 455 is a routine for the link hunting of the extension primary switch, and a process for organizing, in one word, the link number associated with a certain E.PSW number, in accordance with the array of the link configuration 301 of the extension primary switch shown in FIG. 14, is performed in processes 476, 477, 478, 479 and 480 of FIG. 17. Further, for effecting the random hunting, processes and decision 481, 482, 483 and 484 are arranged corresponding to those processes and decision 464, 465, 466 and 467 shown in the routine 453.

The procedure described above is related to the link configurations 300 and 301 of the concentration ratio 1.5:1(3:2), shown in FIGS. 13 and 14. In the cases of the concentration ratios 1.25:1(5:4) and 1.75:1(7:4), the SEL1 datum 411 and the SEL2 datum 412 of FIG. 16 for the selection appointment are altered based on the symbols 310 representative of the second outlets in the link configurations 302 and 304 of FIG. 13, and the processing of the processes 476, 477, 478, 479 and 480 of FIG. 17, for organizing in one word the link number associated with a certain E.PSW number in accordance with the arrays shown in the link configurations 303 and 304, is changed. Therefore, the method of concentration by this invention is very flexible in the alteration of the concentration ratio in the aspect of the procedure.

Figure 20:
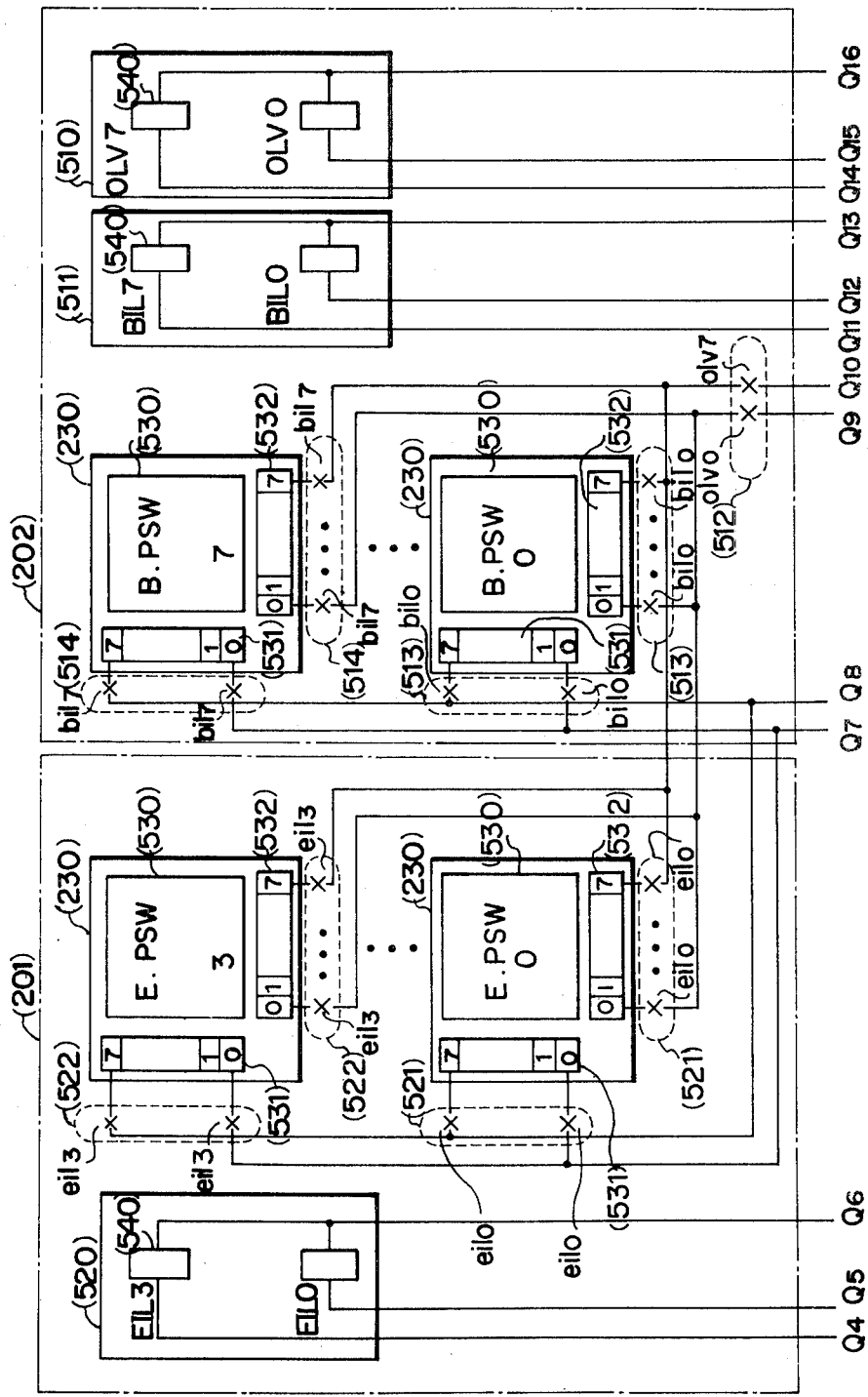
FIGS. 20 and 21 are block diagrams respectively illustrating the constructions of logic circuits and electromechanical circuits.
Figure 21:
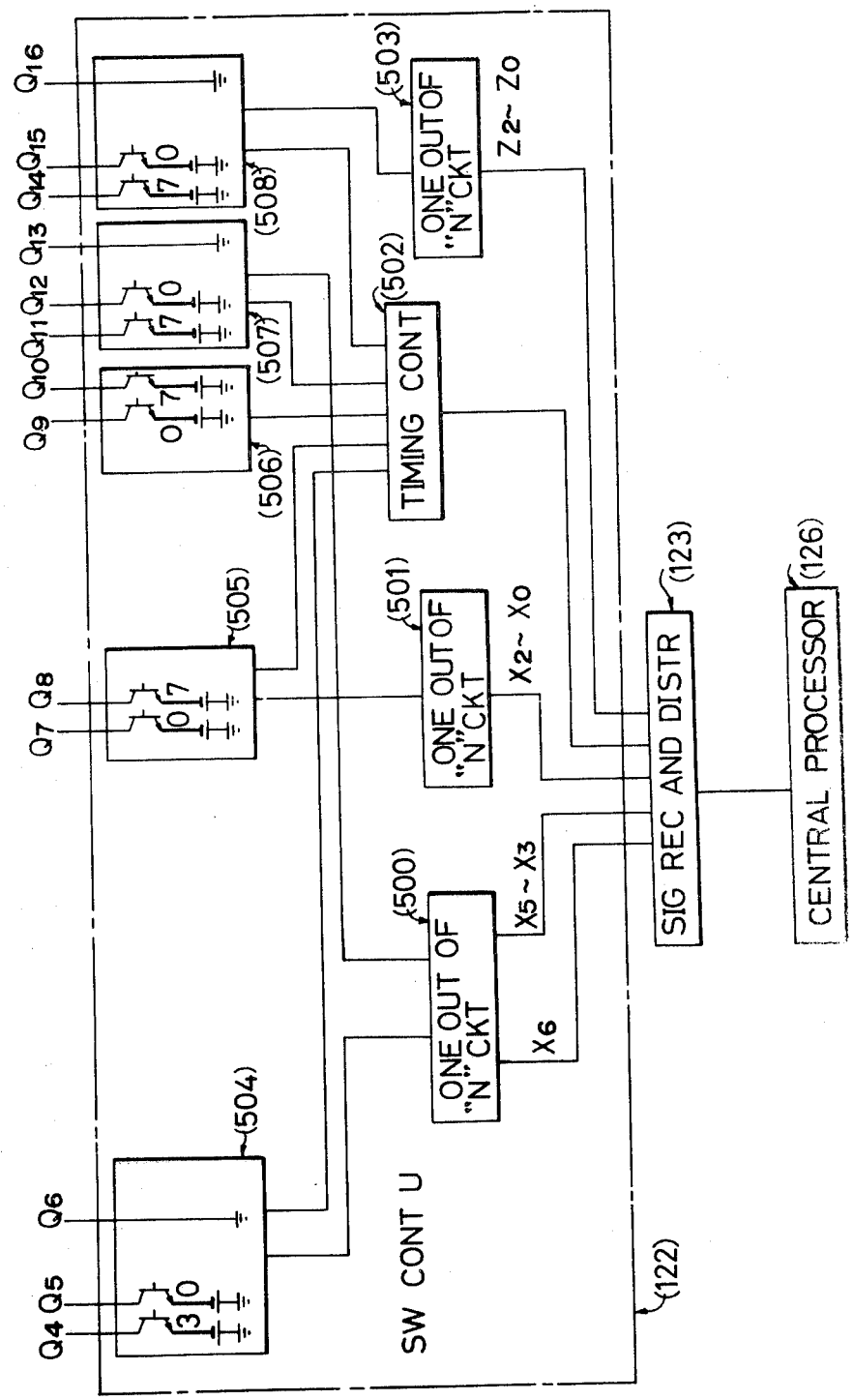

FIG. 19 shows the arrangement of FIGS. 20 and 21 both of which illustrate a cross-point control circuit.

FIGS. 20 and 21 show in block form a circuit structure which comprises logic circuits and electromechanical circuits, and in which the central processor 126 of FIG. 21 sends to the switch control unit 122 through the signal receiver and distributor 123 the input information for the processing shown in FIGS. 17 and 18, such as a bit $X_6$ indicative of the content of the BE datum 401 of FIG. 16 bits $X_5$, $X_4$ and $X_3$ indicative of the content of the PSWSW datum 402, bits $X_2$, $X_1$ and $X_0$ indicative of the content of the ILV datum 403, and the output information of the processing, such as bits $Z_2$, $Z_1$ and $Z_0$ indicative of the content of the OLV datum 404. The number of the network 100 shown in FIG. 8 and a number appointing a specified one of the eight grids forming the primary switches 101 of FIG. 8 are also sent, and then the switch control unit 122 of FIG. 21 performs an operation of closing a specified cross point of the crossbar switch 230 of the basic primary switches 202 or the extension primary switches 201 of FIG. 20. In FIGS. 20 and 21, circuits associated with the grid numbers, which are not so much related to this invention, are not shown for the sake of brevity. A description will be made only in connection with the case of closing the cross points of the extension primary switches 201 and the basic primary switches 202 of the concentration ratio 1.5:1(3:2), shown in FIG. 9, as in the cases of FIGS. 16 to 18C. Then, modifications of the logic circuits and the electromechanical circuits corresponding to other concentration ratios will be described.

In FIG. 21, logic circuits 500 to 508 are respectively composed of integrated circuits or transistors, and make up the switch control unit 122. The extension primary switches 201 and the basic primary switches 202 of FIG. 20 are respectively formed with electromechanical circuits, each comprising a small mechanical latch crossbar switch 230 and a miniature relay 540. The small mechanical latch crossbar switch 230 for transit switching is composed of a matrix 530 having 8 × 8 cross points, a reset magnet group 531 comprising eight magnets, each having a winding corresponding to the ILV number and a finger magnet group 532 comprising eight magnets, each having a winding corresponding to the OLV number. That is, when operating a certain cross-point, a certain voltage is applied for a predetermined duration to one winding of each of the reset magnet group 531 and the finger magnet group 532 which has the number indicated by ILV and OLV corresponding to the cross-point. The operation of the cross-point is maintained mechanically. When releasing a certain cross-point, a certain voltage is applied for a predetermined duration to one winding of the reset magnet group 531 which has the ILV number corresponding to the cross-point. The relays used are miniature relays of the multi-make-contact. Each relay has one winding and eighteen contacts which are put in the make state during operation and in the break state during releasing. A group of eight miniature relays of this type forms path selection relay group 511 which appoints one crossbar switch of the basic primary switches; a group of four miniature relays forms path selection relay group 520 which appoints one crossbar switch of the extension primary switches; and a group of eight miniature relays form path selection relay group 510 which appoints the outlet OLV of the primary switches. The eight relays of the path selection relay group 511 will hereinafter be referred to as BIL0, BIL1, ... and BIL7. Contacts of each relay correspond to B.PSW0, B.PSW1, ... and B.PSW7, respectively forming the basic primary switches, and control the operations of the reset magnets 531 and the finger magnets 532 of th crossbar switches 230. That is, the contacts 513 of BIL0 control the operation of B.PSW0 and the contacts 514 of BIL7 control the operation of B.PSW7. The four relays of the path selection relay group 520 will hereinafter be referred to as EIL0 or EIL3. Contacts of each of the relays correspond to E.PSW0 and to E.PSW3, respectively forming the extension primary switches, and control the reset magnets 531 and the finger magnets 532 of the crossbar switches 230. Namely, the contacts 521 of EIL0 control the operation of E.PSW0, and the contacts 522 of EIL3 control the operation of E.PSW3. Further, the eight relays of the path selection relay group 510 will hereinafter be referred to as OLV0 to OLV7. Contacts of each of the relays control, in correspondence with the OLV numbers, all the finger magnets of all the crossbar switches respectively forming the basic primary switches and the extension primary switches. In other words, the contacts 512 of the path selection relay group 510 control the finger magnets having the windings corresponding to the OLV numbers.

Next, a detailed description will be given of a cross-point control.

The central processor 126 of FIG. 21 sends, in predetermined forms, to the signal receiver and distributor 123, a signal of bit $X_6$ and bits $X_5$ to $X_0$ indicating the inlet terminal of the primary switches, and a signal of bits $Z_2$, $Z_1$ and $Z_0$ indicating the outlet terminal of the primary switches with the OLV number and the network number. The signal receiver and distributor 123 sends the bit $X_6$ and bits $X_5$ to $X_0$, the bits $Z_2$, $Z_1$ and $Z_0$, and a signal for starting a timing control circuit 502 to the switch control unit 122 predetermined in accordance with the network number. A one out of "$n$" circuit 500 determines the actuation of either one driving transistor of a basic primary switch driving circuit 507 or one driving transistor of an extension primary switch driving circuit 504 in accordance with the indication of the bit $X_6$ which indicates either one of the basic primary switches and the extension primary switches, and further selects, in accordance with the indication by the bits $X_5$ to $X_3$, one of the driving transistors which are provided in the basic primary switch driving circuit 507 or the extension primary switch driving circuit 504 corresponding to the primary switches. A one out of "$n$" circuit 501 selects one of the driving transistors of a driving circuit 505 for driving one of the reset magnets 531 of the crossbar switches 230 of FIG. 20, based on the information of the bits $X_2$, $X_1$ and $X_0$ which indicate the ILV number designating the inlet of the basic primary switches or the extension primary switches. A one out of "$n$" circuit 503 of FIG. 21 selects one of the driving transistors of a driving circuit 508 for driving one of the finger magnets 532 of the crossbar switches 230 of FIG. 20 based on the information of the bits $Z_2$, $Z_1$ and $Z_0$ which indicate the OLV number designating the outlet of the basic primary switches or the extension primary switches. Upon determination of the driving transistors by the above circuits, the timing control circuit 502 of FIG. 21 supplies the driving circuit 504 or 507 and the driving circuits 505 and 508 with pulses of a duration necessary for the actuation of the crossbar switch 230 of FIG. 20, thus driving the selected one of the transistors in each driving circuit. At the same time, the timing control circuit 502 of FIG. 21 supplies the driving circuit 506 with pulses of the same duration, thus driving all the transistors in the driving circuit 506. The appointment of the crossbar switch 230 of FIG. 20 is achieved by applying signals from the driving circuit 504 or 507 to the contacts 513 and 514, or 521 and 522 of the reset magnets 531 and the finger magnets 532 through the path selection relay 520 or 511. Further, the outlet appointment of the crossbar switch 230 is effected by applying signals from the driving circuit 508 to the contacts 512 designating the windings of all the finger magnets 532 through the path selection relay group 510.

The above description has been made of the crosspoint control circuit in the case of the concentration ratio 1.5:1 shown in FIG. 12. Also, in the cases of the concentration ratios 1.25:1(5:4) and 1.75:1(7:4), the path selection relay group 511 of FIG. 20 for the switch appointment of the basic primary switches remains unchanged. Further, the path selection relay group 510 for designating the OLV number also remains unchanged since the outlets are of multiple connection so that the OLV number of the basic primary switches and that of the extension primary switches may be coincident with each other, as is seen from the description taken in conjunction with the extension primary switches 201, 204 and 205 in FIGS. 9 to 11. Moreover the influence of wiring alteration of the concentration ratio on the crosspoint control circuit of FIGS. 20 and 21 can be avoided only by designing the electronic circuits and the electromechanical circuits to comply with the concentration ratio 1.75:1(7:4) which is larger than the other ratios 1.5:1(3:2) and 1.25:1(5:4), and by loading the parts such as crossbar swiches 230 to the extension primary switches 201, miniature relays 540 to the path selection relay group 520 and driving transistor to the driving circuit 504. In such a case, attention should be paid to the following matters:

For the 1.25:1(5:4) concentration ratio, only EIL0 and EIL1 in the path selection relay group 520, E.PSW0 and E.PSW1 in the extension primary switches, and two transistors in the driving circuit 504 are needed without any wiring modifications.

For the 1.75:1(7:4) concentration ratio, EIL0, EIL1, . . ., EIL5 in the path selection relay group 520, E.PSW0, E.PSW1, . . . , E.PSW5 in the extension primary switches 201, and six transistors in the driving circuit 504 are needed with similar wiring patterns.

In view of such ease in the modification of the cross point control circuit and in the alteration of the concentration ratio described with regard to FIGS. 16 to 18C, it will be understood that adaptability of the system of this invention for various concentration ratios is appreciably excellent.

Referring next to FIGS. 22 to 32, this invention will be described as being applied to the crossbar switching system. In the following description, the term "channel" is equivalent to the term "link" used in the field of electronic switching system, but the former will be used based on the terminology in the field of crossbar switching.

Figure 22:
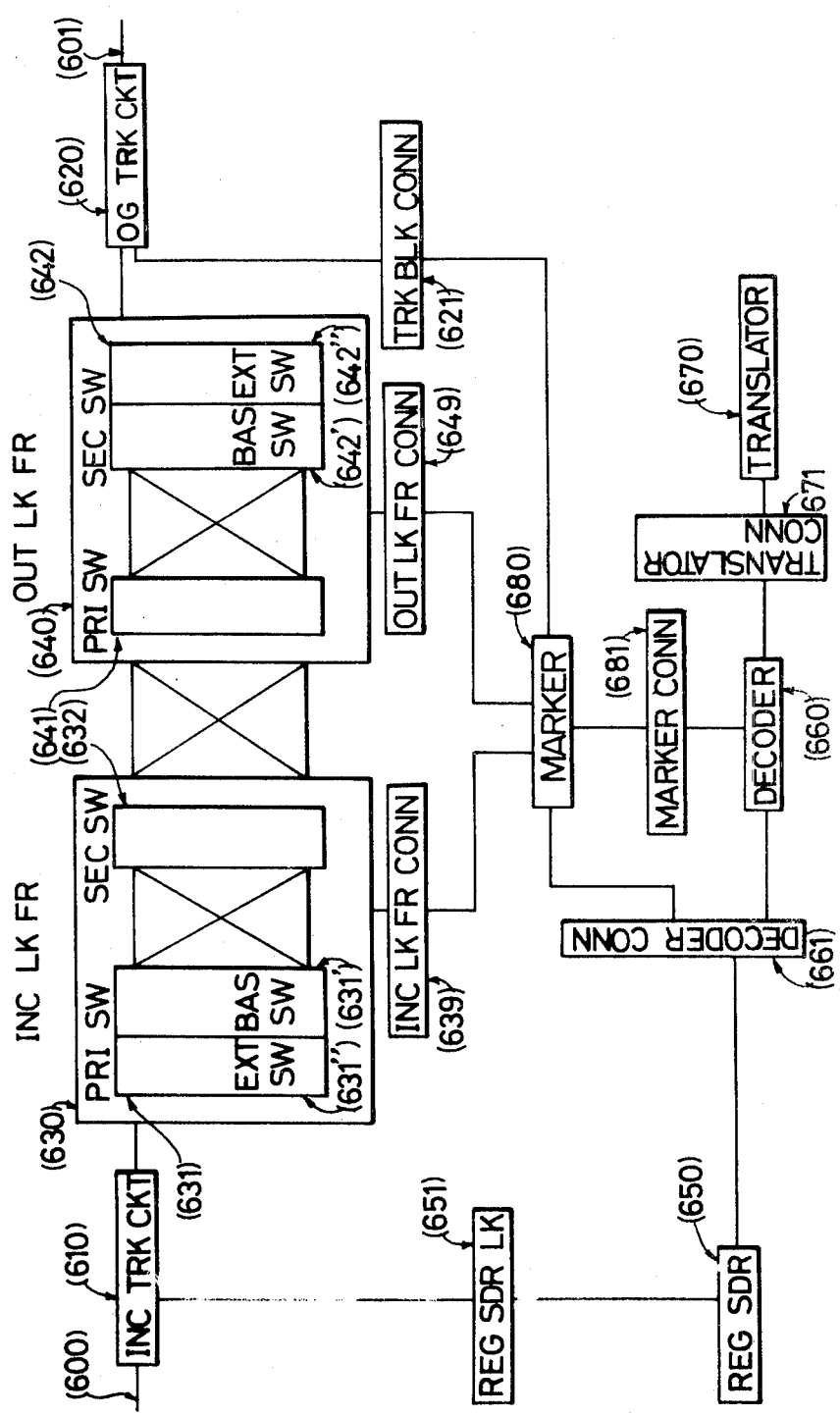
FIG. 22 is a block diagram showing the principal part of a crossbar switching system embodying this invention.

FIG. 22 is a block diagram explanatory of the crossbar switching system to which this invention is applied.

In FIG. 22, an incoming line 600 and an outgoing line 601 respectively have an incoming trunk circuit 610 and an outgoing trunk circuit 620, which are respectively accomodated in an incoming link frame 630 and an outgoing link frame 640, each of which is formed with crossbar switches. A register sender 650, a decoder 660, a translator 670 and a marker 680 form a common control part.

In the illustrated system, upon occurrence of a call in the incoming trunk circuit 610 through the incoming line 600, the register sender 650 is connected to the incoming trunk circuit 610 so as to receive and store dial numbers, i.e. an address signal being sent. The register sender 650 sends the received address signal to the decoder 660 through a decoder connector 661. Having received various informations such as the address signal from the register sender 650, the decoder 660 sends them to the translator 670 through a translator connector 671, and receives from the translator 670 translation information necessary for outlet hunting and charging. The decoder 660 sends the translation information fed thereto from the translator 670 to the marker 680 and the register sender 650. Based on the translation information sent from the decoder 660, the marker 680 selects one idle line from a desired group of outgoing lines through a trunk block connector 621. The marker 680 hunts for an idle channel between the incoming and outgoing lines, and then drives crossbar switches of the incoming link frame 630 and the outgoing link frame 640 to interconnect both frames, setting a speech path. When the speech path to the next office has been established through the incoming link frame 610 and the outgoing link frame 620, the register sender 650 sends the previously stored address signal to the next office. During speech, the common control parts used for the connection of the call are all released, and only the switching network part remains operative.

The fundamental aspects of this invention, described previously with respect to FIGS. 5 to 7, are applied to primary switches 631 indicated by PRIMARY SW. in the incoming link frame 630 or secondary switches 642 indicated by SECOND. SW. in the outgoing link frame 640 in FIG. 22. But the following description will be made mainly in connection with the primary switches 631.

The primary switches 631 includes a basic primary switches 631' indicated by BASIC SW. (i.e. the first matrix group) and an extension primary switches 631" indicated by EXT. SW. (i.e. the second matrix group) in FIG. 22. In the secondary switches 642, the basic secondary switches is indicated by 642' and the extension secondary switches is indicated by 642". Usually, the basic switches and the extension switches are accomodated in different frames. The frame having accomodated therein the basic switches is called basic frame and one frame accomodates eight basic switches. The frame having accomodated therein the extension switches is called an extension frame.

As referred to at the beginning of the present specification, the invention is directed to the multiple connection between the basic and the extension switches and the selection thereof. The following will describe the realization of outlet hunting for obtaining excellent traffic characteristics, that is, precedence selection of the first outlets, and the random hunting of each sub-group of outlets in the second matrix group.

The rule for symbols used in FIGS. 23 to 30 is as follows: Each relay and its contact are labelled with the same alphabets and they are distinguished one from the other by capital and small letters. For example, CHTi ($i$=0, 1, . . . 7) indicates a channel busy test relay and chti ($i$=0, 1, . . . 7) its contact.

The circuit shown in FIG. 23 will be described. The following examples concern the three kinds of concentration ratios 1.25:1(5:4), 1.5:1(3:2) and 1.75:1(7:4). For eight basic switches, the number of extension switches is two in the case of the concentration ratio 1.25:1(5:4), four in the case of the concentration ratio 1.5:1(3:2) and six in the case of the concentration ratio 1.75:1(7:4). In accordance with the number of extension switches, the number of relays PSWCi for the switch connector in the extension frame is also two, four and six. Further, the multiple connection between the extension frame and the basic frame is achieved in the manner described previously in connection with FIGS. 6 and 7.

Turning back to FIG. 23, the circuit shown therein will be described.

1. If the matrix in which a call has occurred is an extension switch, a contact ext is operated, and in the case of a basic switch, a contact bsc is closed.

Now, let it be assumed that the contact bsc has been operated. A contact pswi is operated corresponding to the matrix number $i$ in which a call has occurred, and the frame connector is actuated corresponding to the frame having accomodated therein the matrix, by which a first matrix group connector relay BSGC is actuated to operate a contact bsgc. Then, the switch connector relay PSWCi is actuated to close its contact pswci, whereby a control signal line (hereinafter referred to as the C line), included in the switch for the purpose of channel selection is drawn in the marker. In the channel busy test relay CHTk, the presence or absence of earth is checked. Since earth exists in the C line of a busy outlet, the channel busy test relay CHTk corresponding to the busy outlet is actuated.

2. A channel selection circuit 700 is actuated in accordance with the appointment by a precedence appointment circuit 710, by which one of channel selection relays CHj is operated.

3. Upon actuation of the channel selection relay CHj, a secondary switch selection electromagnet actuating contact sm is operated. Upon actuation of a secondary switch selection electromagnet SSMj and a circuit not shown, a primary switch selecting electromagnet PSMi is actuated. And after a certain period of time, a primary switch holding electromagnet actuating contact hm is operated to actuate a primary switch holding electromagnet PHMj to close its contact phmj and the busy state is thus maintained by the C line during speech.

Next, the operation (2) will be described in detail.

Figure 24:
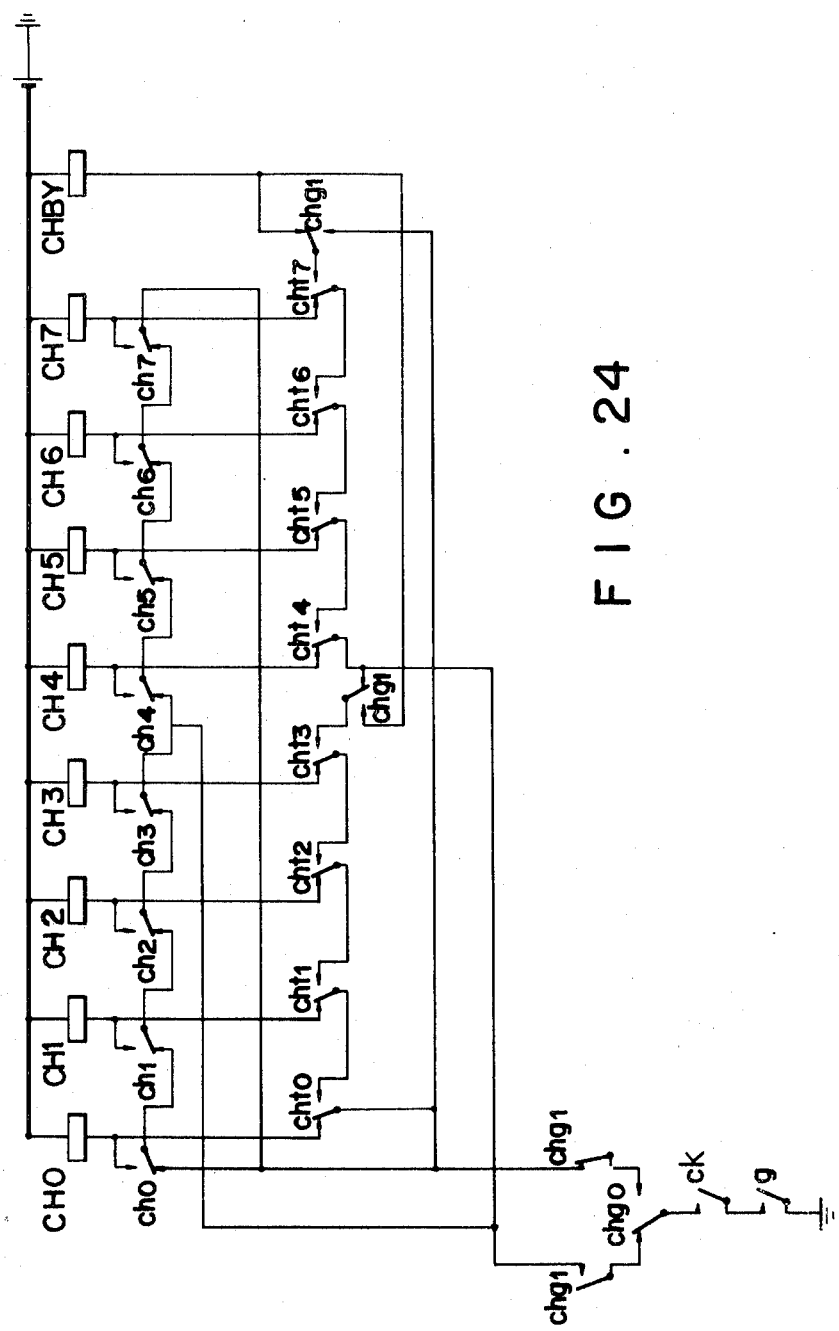

FIG. 24 illustrates a channel selection circuit which, in the case of the concentration ratio 3:2, performs sequential outlet hunting of the first matrix group in the order of the first outlets and the second outlets, and random hunting of the second outlets of the second matrix group in sub-groups of outlets. Next, the channel selecting operation of this circuit will be described.

1. At the start of the operation of the marker, a contact g is in its make state.

2. After the time for the operation of the channel busy test relay CHTi and its contact chti shown in FIG. 23 is secured, a contact ck for checking the operation of the channel busy test relay CHTi is actuated.

3. A contact chgj is operated by the operation of a relay CHGj for precedence appointment of the sub-group of outlets (see FIG. 25) in accordance with the accomodation level of the incoming trunk circuit. Contacts chg0 and chg1 do not operate simultaneously, as described later.

4. When the contact chg0 has been closed, channel selection proceeds from channel 0 to channel 7, and when the contact chg1 has been closed, channel selection proceeds from channel 4 to channel 7 and then from channel 0 to channel 3.

5. For example, in the case of the contact chg1 having operated, if the channel 4 is idle, a contact cht4 does not operate, so that a channel selecting relay CH4 operates, as described with regard to FIG. 23. Namely, the channel 4 is selected.

6. When the contact chg1 has operated, if the channel 4 is busy, a channel busy test relay CHT4 is in operation, so that the channel selecting relay CH4 does not operate and the channel 4 is not selected.

7. In the case of (6), the operation of selecting a channel 5 is achieved through the contact cht4 in the same manner as in (5) and (6).

8. Thereafter, similar operations are repeated, and if all the channels are busy, an all-channel-busy detection relay CHBY operates lastly.

9. Where the contact chg0 has operated, channel selection is carried out following exactly the same procedure as in the case of the contact chg1 having operated, although the order of channel selection is different from that described in (4).

Figure 25A:
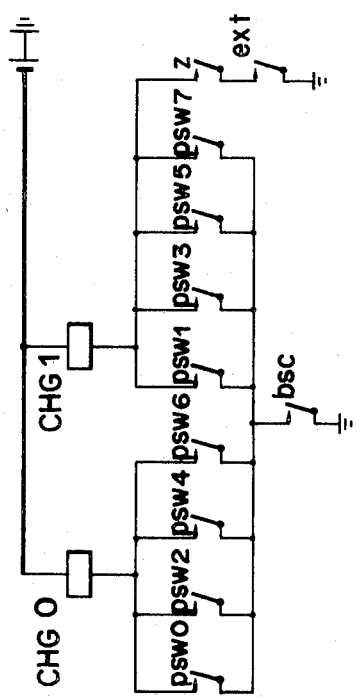
FIGS. 25A and 25B are circuit diagrams of the precedence appointment circuit in the case of a concentration ratio of 3:2.

Turning now to FIGS. 25A and B, a description will be made with respect to the precedence appointment circuit which appoints the order of channel selection in accordance with the accomodation level of the incoming trunk circuit which received a call in the case of the concentration ratio 3:2.

1. When the incoming trunk circuit receives a call, it is accomodated in the first matrix group as follows:

In this case, referring to FIG. 25A, the contact bsc operates to actuate the contact pswi in accordance with the matrix number $i$ of the matrix having accomodated therein the incoming trunk circuit $i$, by which the relay CHG for precedence appointment of the sub-group of outlets is actuated to appoint a channel or sub-group of outlets for precedence selection. That is, in the cases of the matrix number $i$ being 0, 2, 4 and 6, the relay CHG0 is actuated, and in the cases of the matrix number $i$ being 1, 3, 5 and 7, the relay CHG1 is actuated.

Figure 25B:
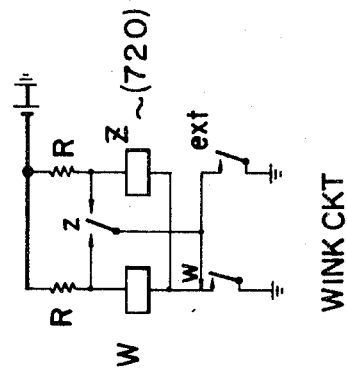

2. When the incoming trunk circuit receives a call it is accomodated in the second matrix group as follows:

In this case, a contact ext operates. If a relay Z of a wink circuit 720 see FIG. 25B is in its operative state, the relay CHG1 of FIG. 25A operates, and if the relay Z is in its release state, the relay CHG0 operates, by which one of the channels or the sub-group of outlets is appointed for precedence selection. Since a contact $z$ and the contact ext are simultaneously closed with every second one of calls occurring in the second matrix group, this ensures random hunting of the second matrix group with every sub-group of their outlets. The principle and operation of the wink circuit 720 of FIG. 25B are set forth in detail in "The Design of Switching Circuits" by William Keister et al, pages 171 to 172.

Turning next to FIG. 26, a description will be given of a channel selection circuit which, in the cases of the concentration ratios 3:2, 5:4 and 7:4, performs sequential hunting of the first matrix group starting with the first outlets and random hunting of the second matrix group via every sub-group of their outlets.

The channel selecting operation of the circuit shown in FIG. 26 is the same as that in the case of FIG. 24, and the channel selecting operations in the cases of the above-said three concentration ratios are achieved with one circuit. That is, the sub-group of outlets for precedence selection is appointed by the actuation of the contact chg0 or chg2 in the case of the concentration ratio 3:2, and any of the contacts chg0, chg1, chg2 and chg3 in the cases of the concentration ratios 5:4 and 7:4. The appointment of the contact chgi for operation is performed by a circuit shown in FIG. 30, but this may also be effected by the circuit of FIG. 25 in the case of the concentration ratio 3:2 (the contact chg1 corresponding to the relay CHG1 in FIG. 25 corresponds to the contact chg2 in FIG. 26), and by a circuit of FIG. 27 in the cases of the concentration ratios 7:4 and 5:4. The channel selection is carried out from the channel $n$ ($n = 0, 2, 4, 6$) of the smallest number in the appointed sub-group of outlets to the channel 7 and then, if $n$ is not 0, the channel selection further proceeds from the channel 0 to the channel $(n-1)$. If all the channels are in the busy state, the aforesaid all-channel-busy detection relay CHBY operates as is the case with FIG. 24.

Referring now to both FIGS. 27A and B, a description will be made of a precedence appointment circuit which appoints the channel selection order in accordance with the accomodation level of the incoming trunk circuit which received a call in the cases of the concentration ratios 5:4 and 7:4.

1. When the incoming trunk circuit receives a call, it is accomodated in the first matrix group:

Because of accomodation in the first matrix group, the contact ext does not operate, and by closing of the contact pswi in accordance with the matrix number $i$ of the matrix having accomodated therein the incoming trunk circuit, the abovesaid relay CHGj is actuated to appoint the sub-group of outlets of precedence selection. That is, in the cases of the matrix number $i$ being 0 and 4, the relay CHG0 is actuated; in the cases of 1 and 5, the relay CHG1 is actuated; in the cases of 2 and 6, the relay CHG2 is actuated; and in the cases of 3 and 7, the relay CHG3 is actuated.

2. When the incoming trunk circuit receives a call, it is accomodated in the second matrix group as follows:

The contact ext is closed because of accomodation in the second matrix group.

When relays SQ0 and SQ1 have been operated by a sequence circuit, the sub-group of outlets for precedence selection is appointed by the actuation of the relay CHG0 in the case of relays SQ0 and SQ1 having been operated by a sequence circuit, by the actuation of the relay CHG1 in the case of the relays SQ1 and SQ2 having been operated, by the actuation of the relay CHG2 in the case of the relays SQ2 and SQ3 having been operated, and by the actuation of the relay CHG3 in the case of the relays SQ3 and SQ0 having been operated.

The principle and operation of the sequence circuit are as disclosed in "The Design of Switching Circuits" by William Keister et al, pages 271 to 272.

Figure 28:
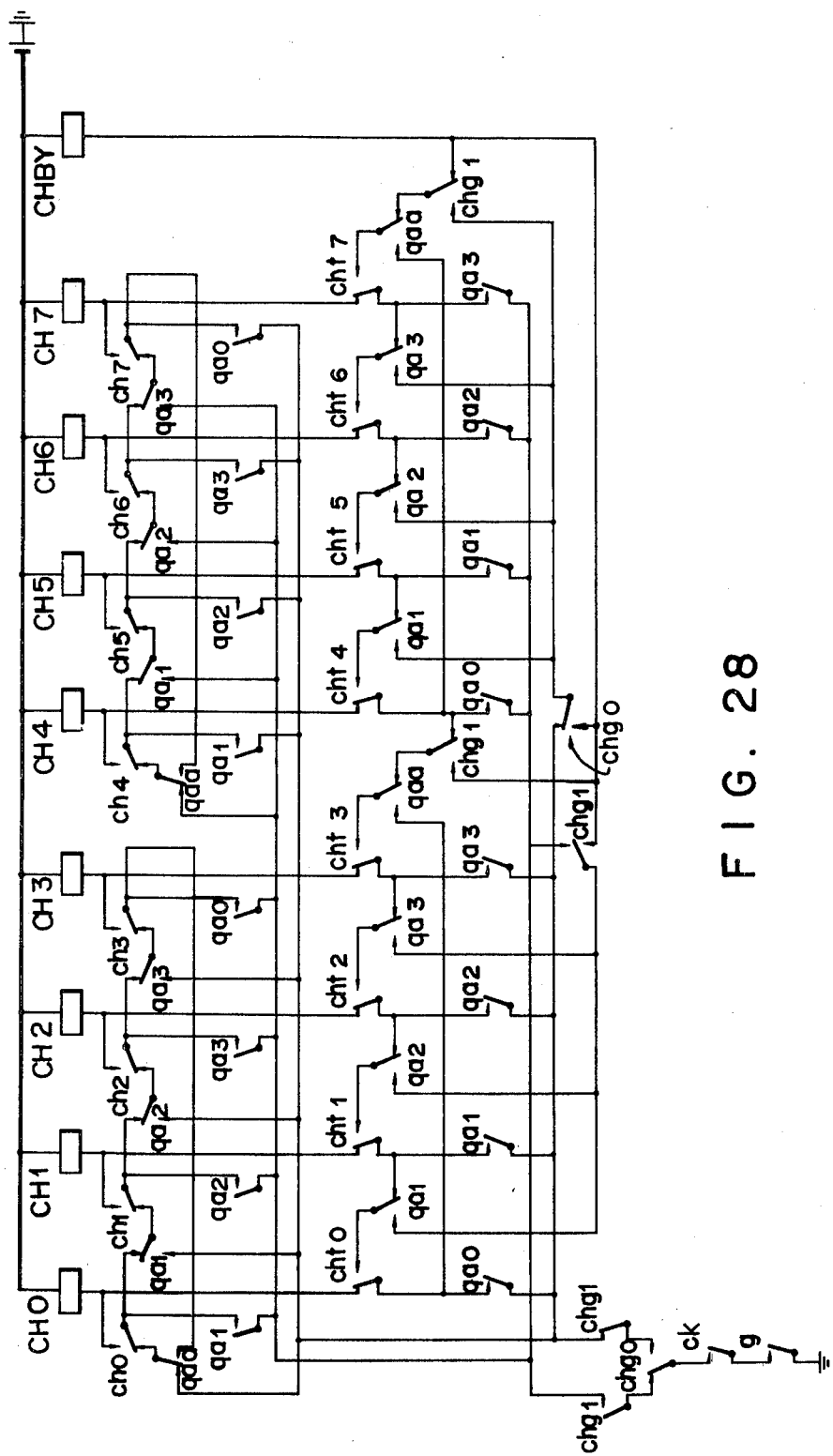
FIG. 28 is a circuit diagram of a channel selection circuit for the case of a concentration ratio 3:2.

With reference to FIG. 28, a description will be given of a channel selection circuit which, in the case of the concentration ratio 3:2, performs random hunting of the first outlets and then the second outlets of the first matrix group, and random hunting of the second outlets of the second matrix group which is more random than in the case of FIG. 24.

The channel selecting operation by this circuit is basically identical with that in the case of FIG. 24, but different from the latter in that the channel selection order does not always remain unchanged.

The operation of the contacts chg0 and chg1 is controlled by the circuit shown in FIG. 25, and contacts qa0, qa1, qa2, qa3 and qaa are controlled by a circuit described later in connection with FIG. 29.

When the contact qa0 has operated, the other contacts qa1, qa2 and qa3 do not operates as will be described later with respect to FIG. 29, so that the channel selecting operation is exactly the same as that in the case of FIG. 24.

When the contact qa1 has operated, the contact qaa operates simultaneously, as will be described later in connection with FIG. 29, so that when the contact chg0 has operated, channel selection is carried out in the order of the channel number $1 \to 2 \to 3 \to 0 \to 5 \to 6 \to 7 \to 4$ and when the contact chg1 has operated, channel selection is achieved in the order of $5 \to 6 \to 7 \to 4, \to 1 \to 2 \to 3 \to 0$. In either case, if all the channel are busy, the all-channel-busy detection relay CHBY is actuated.

Figure 29:
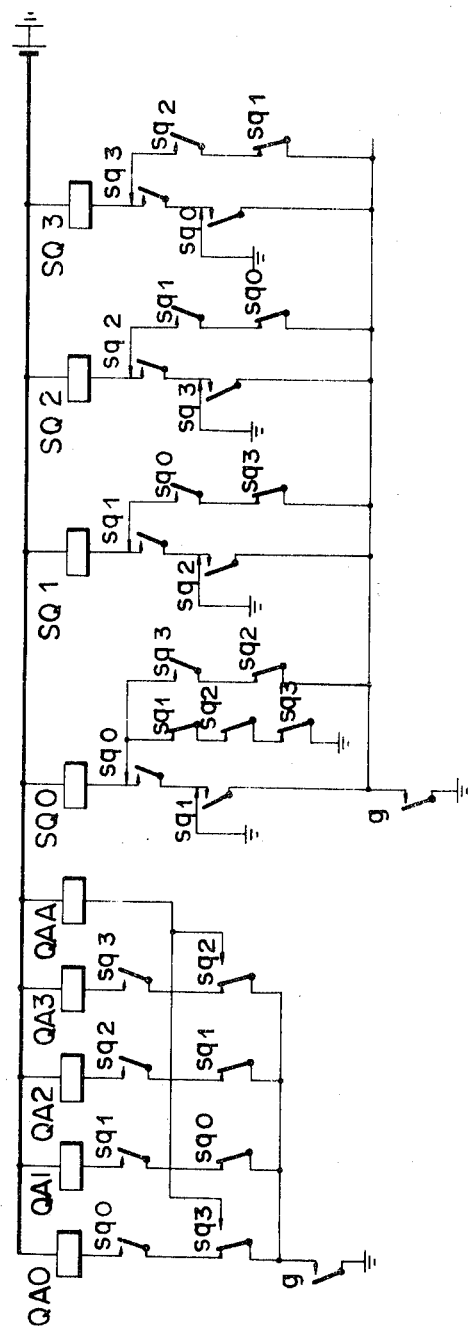
FIG. 29 is a circuit diagram of a sequence circuit for the case of a concentration ratio 3:2.

Also when the contact qa2 or qa3 has operated, the contact qaa operates as will be set forth with regard to FIG. 29, so that when the contact chg0 has operated, the channels 0 to 3 are cyclically selected, and then, the channels 4 to 7 are cyclically selected as in the case of the contact qa1 having operated, and when the contact chg1 has operated, the channels 4 to 7 are cyclically selected, and then, the channels 0 to 3 are cyclically selected. However, when the contact qa2 or qa3 operate, the selection starting channel differs. When the contact chg0 has operated, channel selection starts with the channel 2 or 3, respectively, and when the contact chg1 has operated, channel selection starts with the channel 6 or 7, respectively.

Turning to FIG. 29, a description will be made of a sequence circuit which is employed for random hunting of outlets in the case of the concentration ratio 3:2.

Contacts g are in operation at the start of operation of the marker. When the relays SQ0 and SQ1 have been actuated by the sequence circuit, only a relay QA0 for appointment of the selection starting channel operates. When the relays SQ1 and SQ2, SQ2 and SQ3, or SQ3 and SQ0 operate in pair, relays QA1, QA2 or QA3 for appointment of the selection starting channel operate together with an intra-channel-group cyclic selection controlling relay QAA.

Figure 30B:
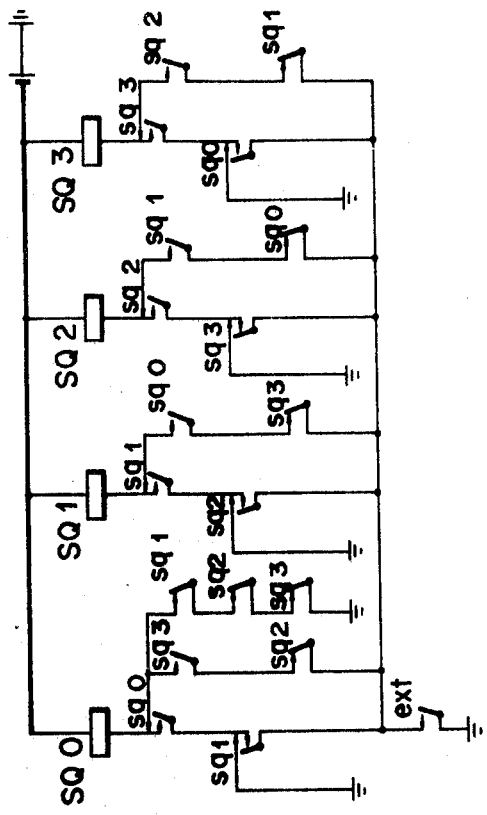
FIGS. 30A and 30B are circuit diagrams of a precedence appointment circuit in the case of concentration ratios 3:2, 5:4 and 7:4.
Figure 30A:
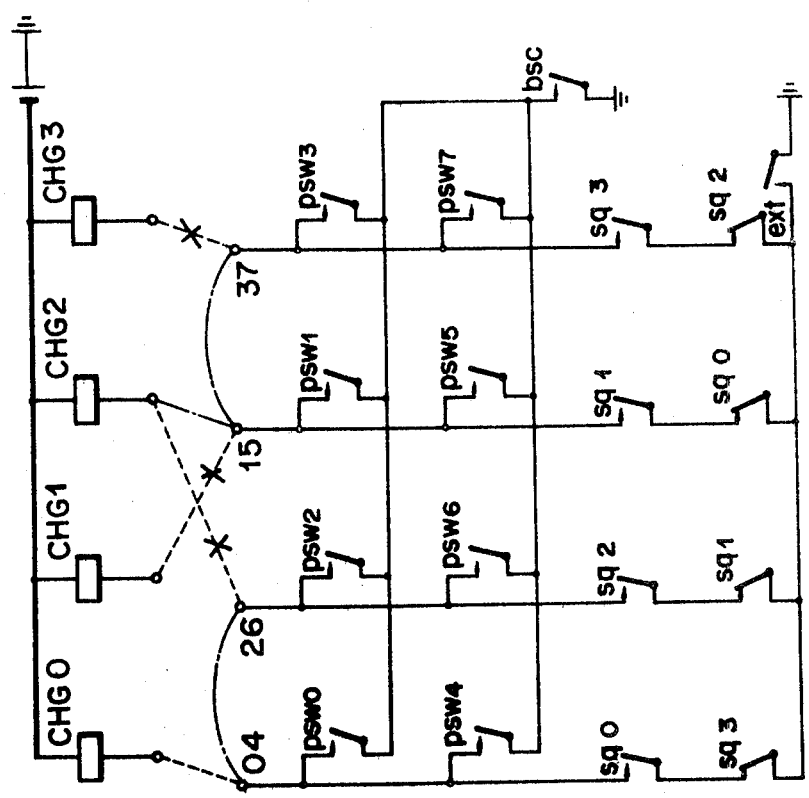

Turning next to FIGS. 30A and B, a precedence appointment circuit will be described which appoints the sub-group of outlets for precedence selection in accordance with the accomodation level of the incoming trunk circuit which received a call in the cases of the concentration ratios 3:2, 5:4 and 7:4. The broken lines in FIG. 30A indicate straps in the cases of the concentration ratios 7:4 and 5:4. When the concentration ratio is 3:2, the straps are cut at places marked with x and a jumper is effected as indicated by the one-dot chain line.

Figure 27A:
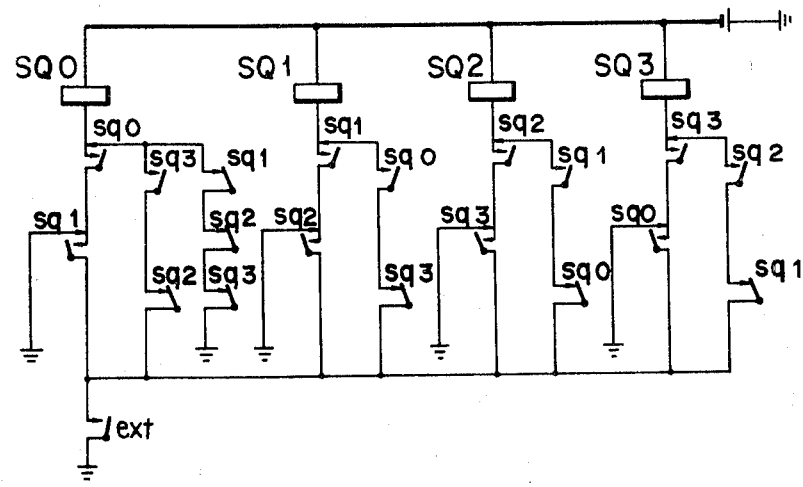
FIGS. 27A and 27B are circuit diagrams of a precedence appointment circuit for use in cases of a concentration ratio of 5:4 or 7:4.

The operation of appointment of the sub-group of outlets for precedence selection by this circuit is basically the same as that in the case of FIGS. 27A and B. Especially in the case where the concentration ratio is 5:4 and 7:4 and the incoming trunk circuit received a call is accomodated in the second matrix group, the operation of this circuit is exactly identical with that in the case of FIGS. 27A and B.

When the concentration ratio is 3:2 and the incoming trunk circuit received a call which is accomodated in the second matrix group, the contact ext is closed. When the relays SQ0 and SQ1 or SQ2 and SQ3 are actuated by the sequence circuit, the relay CHG0 for appointment of the sub-group of outlets for precedence selection operates. When the relays SQ1 and SQ2 or SQ3 and SQ0 are actuated, the relay CHG2 operates. The contact chg2 in this case corresponds to the contact chg1 in FIG. 24.

When the incoming trunk circuit received a call which is accomodated in the first matrix group, the contact bsc operates to actuate the contact pswi in accordance with the matrix number i of the matrix having accomodated therein the incoming trunk circuit, by which the relay CHGj is operated to appoint the sub-group of outlets for precedence selection. Namely, in the case of the concentration ratio 3:2, when the matrix number i is 0, 2, 4 and 6, the relay CHG0 operates, and when the matrix number i is 1, 3, 5 and 7, the relay CHG2 (corresponding to the relay CHG1 in FIG. 24) operates. In the cases of the concentration ratios 5:4 and 7:4, the relays CHG0, CHG1, CHG2 and CHG3 operate respectively when the matrix number i is 0 and 4, 1 and 5, 2 and 6, and 3 and 7.

Figure 27B:
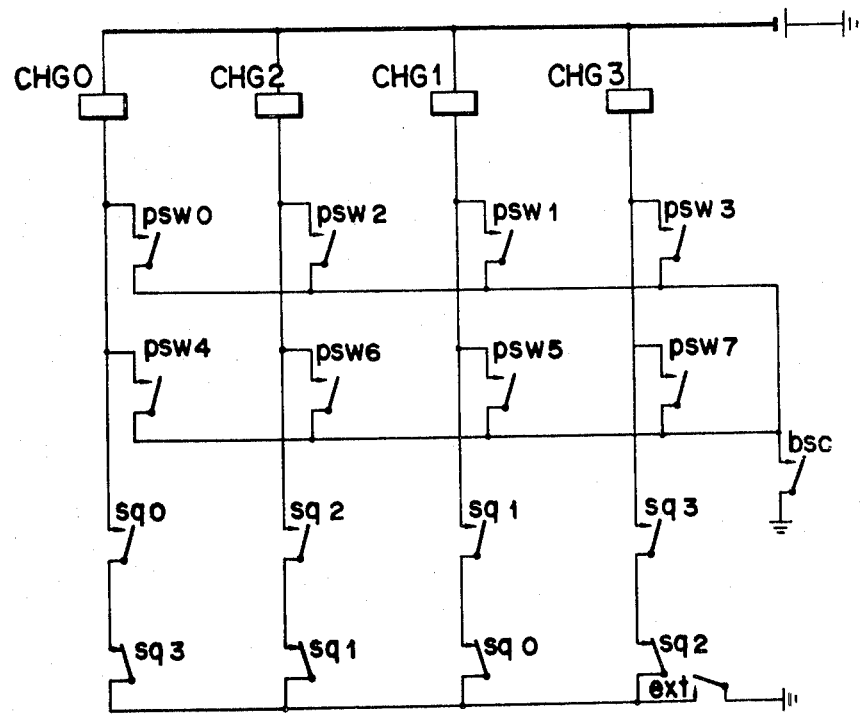
Figure 31:
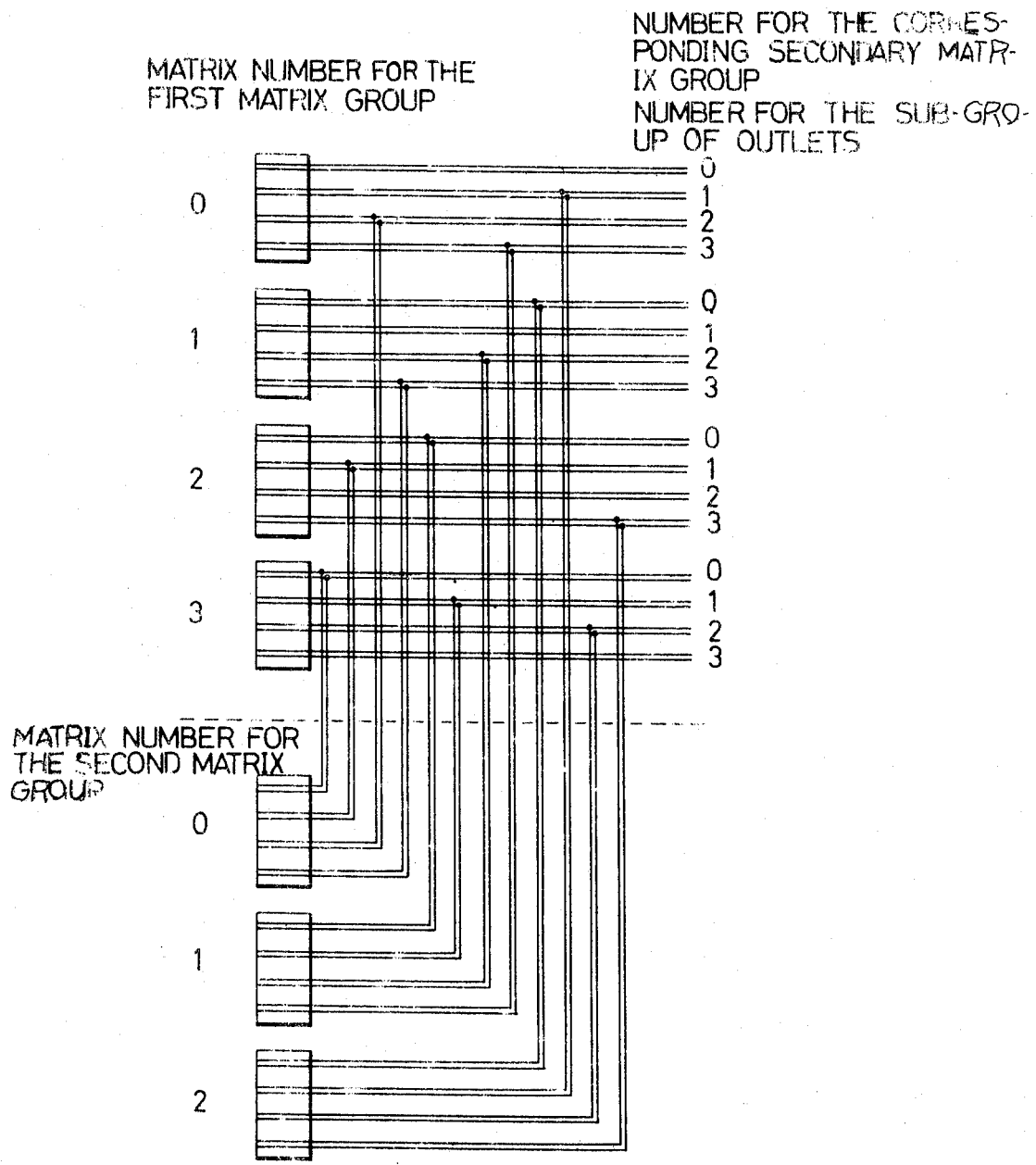
FIG. 31 is a block diagram explanatory of the multiple connection for preventing inbalance of service between matrixes.

The wiring in the case of the concentration ratio 3:2 is required to be different from wiring in the cases of the concentration ratios 5:4 and 7:4 as in FIG. 30 due to the fact that the multiple connection for the concentration ratio 3:2 is used. In the case of FIG. 6 or 31, if the first matrix group is formed with four matrixes regardless of the concentration ratio used, and if the second matrix group is formed as follows:

in the case of the concentration ratio of 5:4, the matrix number for the second matrix group is only 0, in the case of the concentration ratio 3:2, the matrix numbers for the second matrix group are 0 and 1, in the case of the concentration ratio 7:4, the matrix numbers for the second matrix group are 0, 1 and 2, such wiring alteration as in FIG. 30A is not necessary, and the precedence appointment circuit of FIG. 27B can be used in the case of the concentration ratio 3:2, too.

Figure 23:
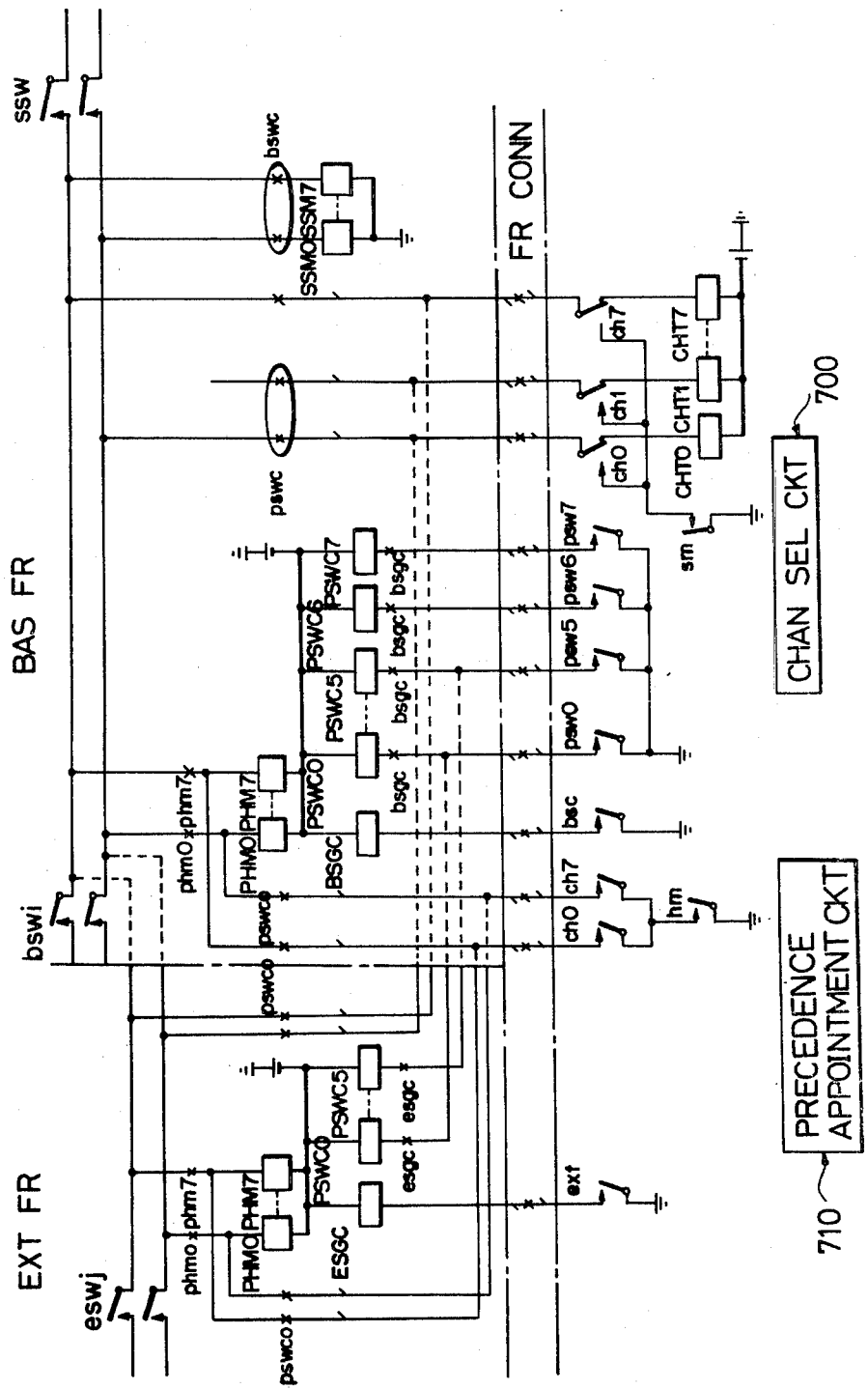
FIGS. 23 and 24 are circuit diagrams explanatory of details of the system shown in FIG. 22.

By the way, in the case of the concentration ratio 1.75:1(7:4), if use is made of the multiple-connection structure of FIG. 6 and the circuit constructions of FIGS. 23, 26 and 27, the matrix of the second matrix number 0 (which means or indicates the matrix of the matrix number 0 for the second matrix group in FIG. 6 or 31 this applies to the matrixes of the other matrix numbers) has multiple connection with the sub-group of outlets which is lastly selected in each of the matrixes of the first matrix numbers 0, 1, 2 and 3. On the other hand, the matrix of the second matrix number 2 has multiple connection with the sub-group of outlets of each of the matrixes of the first matrix numbers 0, 1, 2 and 3 which is selected immediately after the first outlets are selected. This results in an imbalance of service among the matrixes of the second matrix group. To avoid this, it is necessary to adopt multiple connection as shown in FIG. 31. The matrixes of the second matrix group each have multiple connection with the sub-group of the second outlets of each first matrix group as follows:

The matrix of the matrix number 0 of the second matrix group has multiple connection with the following sub-groups of the second outlets:
2nd of first matrix number 0,
2nd of first matrix number 1,
3rd of first matrix number 2,
1st of first matrix number 3.

The matrix of the matrix number 1 of the second matrix group has multiple connection with the following sub-groups of the second outlets:
3rd of first matrix number 0,
1st of first matrix number 1,
2nd of first matrix number 2,
2nd of first matrix number 3.

The matrix of the matrix number 2 of the second matrix group has multiple connection with the following sub-group of the second outlets:
1st of first matrix number 0,
3rd of first matrix number 1,
1st of first matrix number 2,
3rd of first matrix number 3,
where "Nth of first matrix number M" means the sub-group of the second outlets of the first matrix number M which is selected for the Nth time after the first outlets are selected. Thus, imbalance of service among the matrixes of the secondary matrix group is removed.

FIG. 32 shows in the form of drawing numbers the arrangement of the circuits for realizing the respective concentration ratios. The symbol * indicates the case of providing the function of random hunting both in the first outlets and second outlets in the first matrix group.

Figure 33:
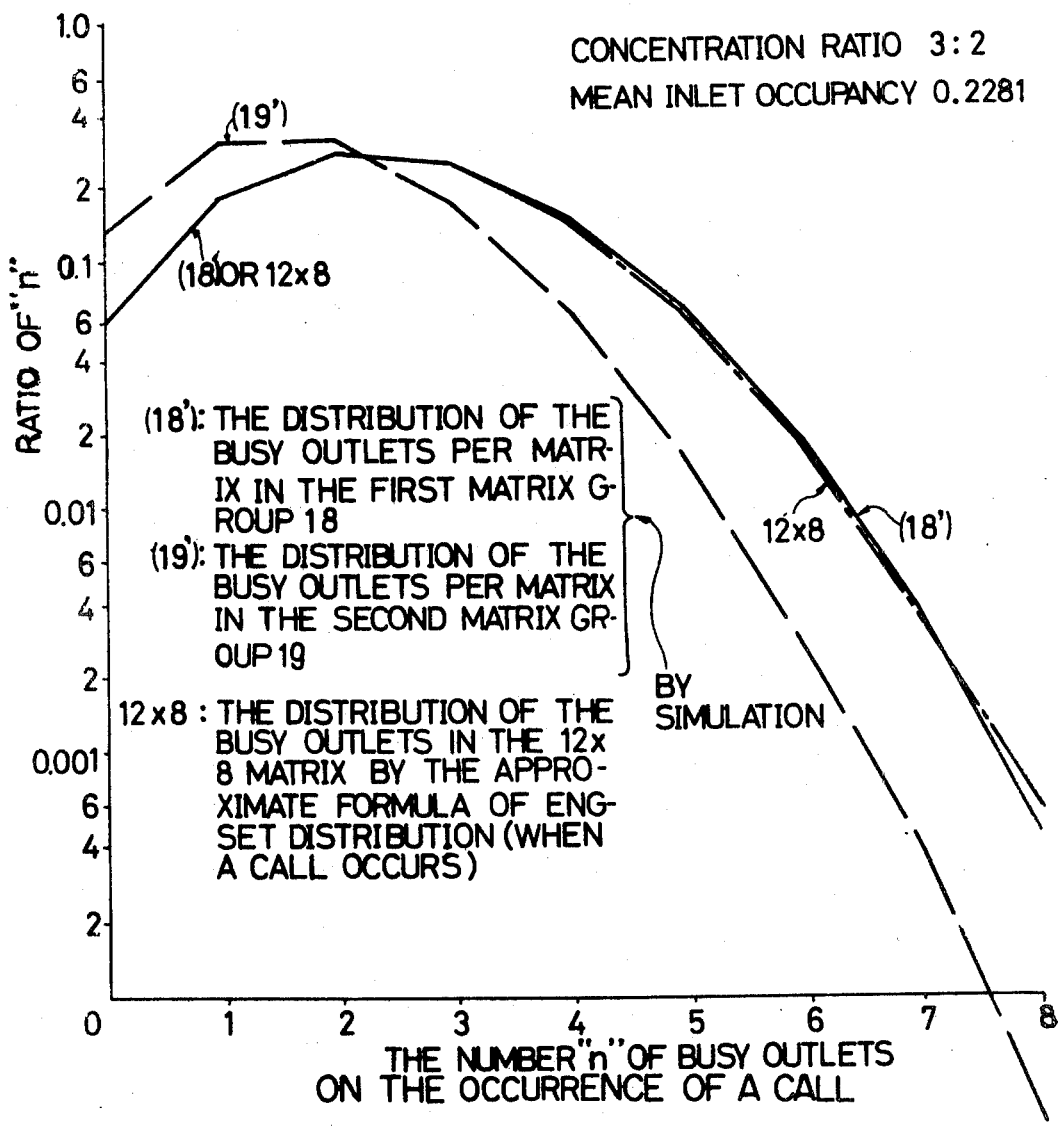
FIGS. 33 to 35 are graphs explanatory of the effects of this invention.
Figure 34:
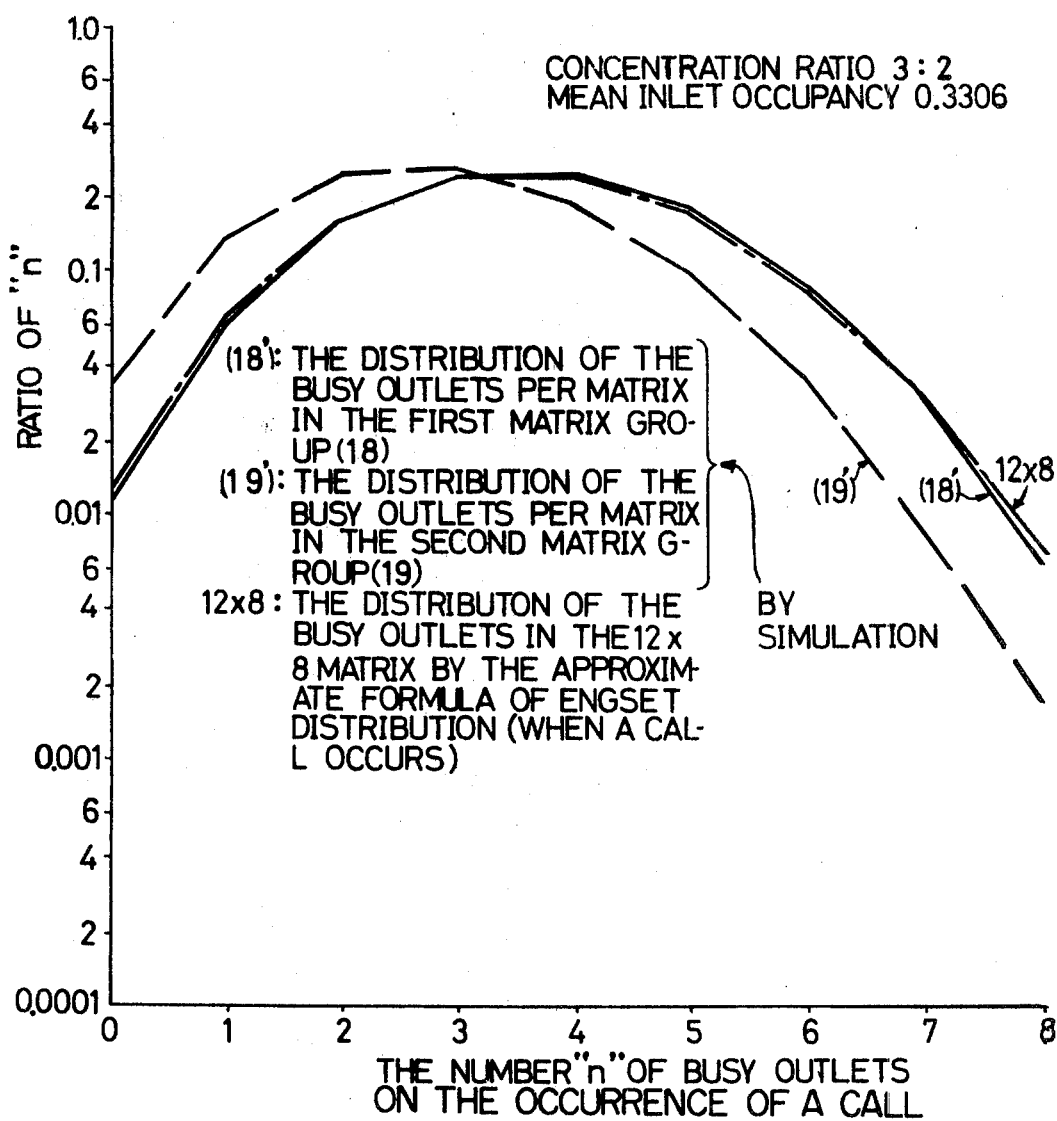
Figure 35:
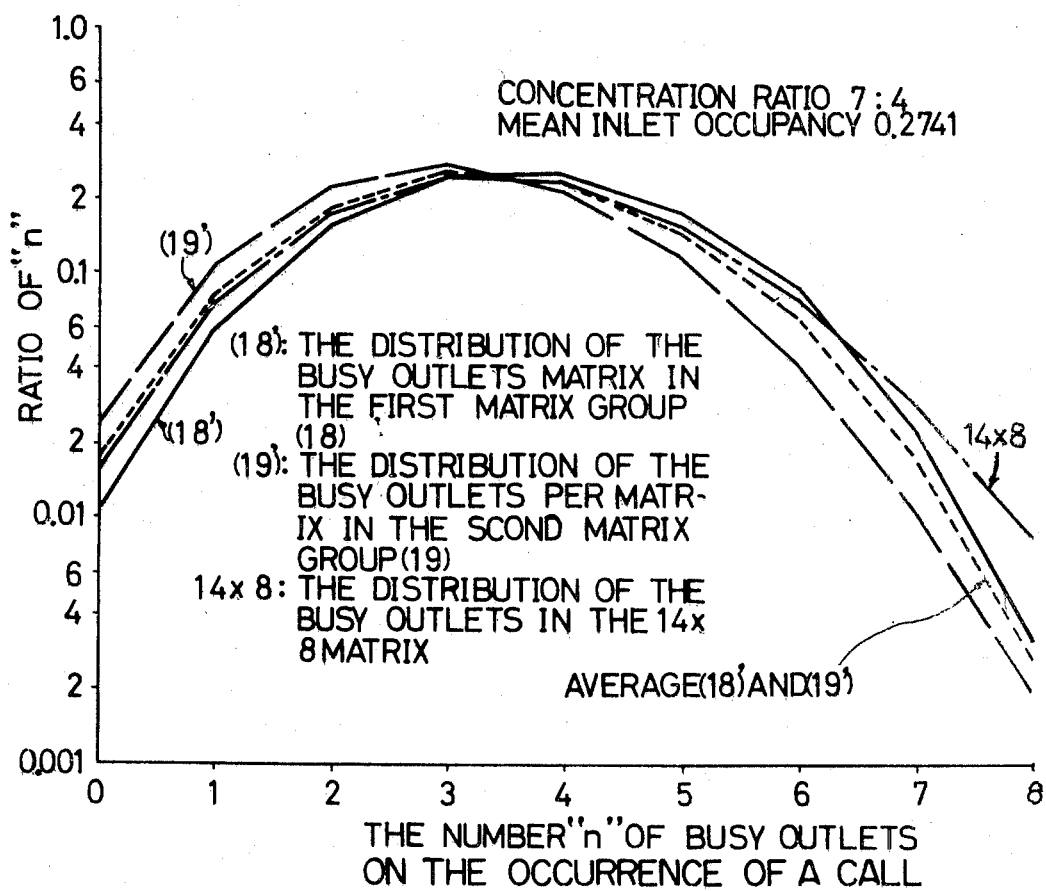

FIGS. 33, 34 and 35 respectively show the distributions of busy outlets on the occurrence of a call in the case of this invention, which was obtained by simulations of about 200,000 calls in each of them. The abscissa represents the number "n" of busy outlets on the occurrence of a call (n=0, 1, ... 8 this is because the number of outlets accessible by one matrix was selected to be eight) and the ordinate represents the ratio of "n". FIGS. 33 and 34 show the cases of the concentration ratio 3:2 and FIG. 35 the case of the concentration ratio 7:4. In FIG. 33, the mean inlet occupancy $\alpha_1$ calculated from carried traffic is 0.2281; in FIG. 34, the mean inlet occupancy $\alpha_1$ is 0.3306; and in FIG. 35, the mean inlet occupancy $\alpha_1$ is 0.2741. The full lines each indicate the distributions of the number of busy outlets present in the eight outlets accessible by the matrix of the first matrix group when a call was offered in the matrix. The broken lines each indicate the distributions of the number of busy outlets present in the eight outlets accessible by the matrix of the second matrix group when a call was offered in the matrix. The one-dot chain lines each indicate the distributions of the number of busy outlets when a call was offered in a matrix having twelve inlets and eight outlets, which distributions were obtained with the following approximate formula of the Engset distribution for the number of busy links, using the mean inlet occupancy $\alpha_1$ obtained from simulation:

$$b_r = \frac{\binom{N-1}{r}\alpha^r}{\sum_{n=0}^{8}\binom{N-1}{n}\alpha^n} \quad (\alpha: \text{offered traffic per idle inlet})$$

$$\approx \frac{\binom{N-1}{r}\alpha_1^r(1-\alpha_1)^{N-1-r}}{\sum_{n=0}^{8}\binom{N-1}{n}\alpha_1^n(1-\alpha_1)^{N-1-R}}$$

where N is the number of inlets. In FIGS. 33 and 34, N = 12 and in FIG. 35, N = 14.

As regards the traffic characteristics, it might be said that the higher the left sides of the broken line graphs are, the more excellent the characteristics are. In FIGS. 33 and 34, the distribution of busy outlets per matrix in the second matrix group, indicated by the broken line, has more excellent characteristics than the others, and the one-bit chain line and the broken line substantially coincide. That is, loads of both of the first and second matrix groups are applied to the outlets accessible by one matrix of the first matrix group, and the load is substantially equal to that in the case of the matrix having twelve inlets and eight outlets. But the distribution of busy outlets per matrix in the second matix group has excellent characteristics by the effect of packing because of the precedence selection of the first outlets in the first matrix group, and it might be said that the overall traffic characteristics are also more excellent that those of the matrix having twelve inlets and eight outlets.

Also in FIG. 35, the traffic characteristics of the first matrix group are a little inferior to those of a matrix having fourteen inlets and eight outlets, but the traffic characteristics of the second matrix group are better than that of the above matrix, and it might be said that the overall traffic characteristics are also equal to or better than those of the above matrix. In FIG. 35, the short broken line shows the frequency distribution of the first and second matrix groups altogether.

It will be apparent that many modifications and variations may be effected without departing from the scope of the novel concepts of this invention.

What is claimed is:

1. A telecommunication switching system comprising:
   a first matrix group including a plurality of matrixes, each matrix having $n$ outlets;
   a second matrix group including a plurality of matrixes, each matrix having $n$ outlets; and
   an outlet hunting device;
   said plurality of matrixes in said first matrix group being $m$ in number, where $m$ is a positive divisor of $n$ larger than unity;
   said plurality of matrixes in said second matrix group being $(1-m)$ in number, 1 being positive and in the range defined by $2m > 1 > m$;
   said $n$ outlets of each matrix of said first and second matrix groups being divided into sub-groups of $n/m$ outlets per sub-group;
   each matrix of said first matrix group having a first group of outlets of non-multiple connection and a second group of $n(1-m)/m$ outlets which are multiple-connected in groups of $n/m$ outlets to $n/m$ outlets of each matrix of said second matrix group;
   each matrix of said second matrix group having only a second group of $n$ outlets which are multiple-connected in groups of $n/m$ outlets to $n/m$ outlets of each matrix of said first matrix group;
   wherein the outlet hunting device performs selection of the sub-groups of said outlets of said second matrix group by random hunting.

2. The telecommunication switching system according to claim 1, wherein the outlet hunting device hunts for an idle outlet of the first matrix group, said outlet hunting device always starting with the first outlets of said first matrix group so long as an idle outlet exists in the first outlets.

3. The telecommunication switching system according to claim 1, wherein the outlet hunting device includes a sequence circuit for appointing the order of selection of the outlets of the second matrix group.

4. The telecommunication switching system according to claim 1, wherein the outlet hunting device includes a wink circuit for appointing the order of selection of the outlets of the second matrix group.

5. The telecommunication switching system according to claim 1, wherein said outlet hunting device includes a stored logic circuit for providing logic representations of a sequence of electronic switching functions, and means responsive to said logic representations for effecting said sequence of electronic switching functions, whereby to perform said outlet hunting.

6. The telecommunication switching system according to claim 2, wherein said system includes a plurality of relays, each actuable for selecting respective outlets of said first matrix group, said outlet hunting device including a precedence appointment circuit for actuating said relays in a given order so as to appoint the order of selection of the outlets of the first matrix group in accordance with precedence appointment of sub-groups of outlets.

7. The telecommunication switching system according to claim 2, wherein the outlet hunting device includes a sequence circuit for performing random outlet hunting both in the outlets of said first matrix group and in the outlets of said second matrix group.

* * * * *

UNITED STATES PATENT AND TRADEMARK OFFICE
CERTIFICATE OF CORRECTION

PATENT NO. : 4,079,207
DATED : March 14, 1978
INVENTOR(S) : Tohru Ueda et al

It is certified that error appears in the above-identified patent and that said Letters Patent are hereby corrected as shown below:

Column 2, line 38, "network" should be --technique--.
Column 5, line 26, "$V_1$" should be --1--.
Column 5, line 27, "$V_0$" should be --0--.
Column 6, line 13, "stores" should be --stored--.
Column 7, line 49, "secondar" should be --secondary--.
Column 10, line 17, delete "defini-".
Column 10, line 18, delete "tions".
Column 17, line 9, "CHG" should be --CHG j--.
Column 17, line 18, "720" should be --(720)--
Column 17, line 27, "720" should be --(720)--.

Signed and Sealed this

Fifteenth Day of August 1978

[SEAL]

Attest:

RUTH C. MASON
Attesting Officer

DONALD W. BANNER
Commissioner of Patents and Trademarks